United States Patent
Fukase

(10) Patent No.: US 10,440,233 B2
(45) Date of Patent: Oct. 8, 2019

(54) IMAGE PROCESSING APPARATUS, IMAGE PROCESSING METHOD, AND MEDIUM

(71) Applicant: Takahiro Fukase, Kanagawa (JP)

(72) Inventor: Takahiro Fukase, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/259,045

(22) Filed: Jan. 28, 2019

(65) Prior Publication Data

US 2019/0238724 A1  Aug. 1, 2019

(30) Foreign Application Priority Data

Jan. 31, 2018  (JP) ................. 2018-015939

(51) Int. Cl.
*H04N 1/60* (2006.01)
*G01J 3/52* (2006.01)

(52) U.S. Cl.
CPC .............. *H04N 1/6027* (2013.01); *G01J 3/52* (2013.01); *H04N 1/6025* (2013.01)

(58) Field of Classification Search
None
See application file for complete search history.

(56) References Cited

U.S. PATENT DOCUMENTS

| | | | |
|---|---|---|---|
| 5,696,889 A * | 12/1997 | Morikawa | H04N 1/4078 358/1.9 |
| 6,185,007 B1 * | 2/2001 | Hayashi | H04N 1/6033 358/1.9 |
| 7,733,545 B2 * | 6/2010 | Sakakibara | H04N 1/6094 345/591 |
| 8,649,020 B2 | 2/2014 | Ishizaki et al. | |
| 9,030,710 B2 * | 5/2015 | Nakamura | H04N 1/6052 358/1.9 |
| 2003/0053689 A1 * | 3/2003 | Watanabe | G06T 5/004 382/167 |

(Continued)

FOREIGN PATENT DOCUMENTS

| | | |
|---|---|---|
| JP | 4459127 | 4/2010 |
| JP | 5880997 | 3/2016 |
| JP | 6244944 | 12/2017 |

*Primary Examiner* — Anh-Vinh T Nguyen
(74) *Attorney, Agent, or Firm* — IPUSA, PLLC

(57) ABSTRACT

An image processing apparatus generates color conversion data in which first color component values in a first color space are associated with second color component values in a second color space. The apparatus executes determining a reference curve that takes a maximum value in the second color space among curves representing gradations of color components in the first color space; determining interpolation guide curves that represent a maximum gradation and a minimum gradation of a color component to be interpolated in the first color space; executing colorimetry on color patches corresponding to second color component values in the reference and interpolation guide curves; interpolating second color component values not included in the reference and interpolation guide curves, based on the second color component values obtained by the colorimetry; and generating the color conversion data by using the second color component values obtained by the colorimetry and the interpolation.

6 Claims, 24 Drawing Sheets

(56) References Cited

U.S. PATENT DOCUMENTS

| | | | |
|---|---|---|---|
| 2003/0085941 A1* | 5/2003 | Tezuka | G03G 15/5062 347/19 |
| 2004/0246527 A1* | 12/2004 | Kakutani | H04N 1/6019 358/3.01 |
| 2005/0206927 A1* | 9/2005 | Yamada | H04N 1/4072 358/1.9 |
| 2006/0022996 A1* | 2/2006 | Kondo | H04N 1/6025 345/604 |
| 2007/0081178 A1* | 4/2007 | Kim | H04N 1/6025 358/1.9 |
| 2007/0091110 A1* | 4/2007 | Yamada | H04N 1/6005 345/589 |
| 2007/0229862 A1* | 10/2007 | Derhak | H04N 1/6022 358/1.9 |
| 2008/0100887 A1* | 5/2008 | Hayase | H04N 1/6025 358/504 |
| 2009/0237689 A1* | 9/2009 | Tokunaga | H04N 1/4015 358/1.9 |
| 2009/0251715 A1* | 10/2009 | Kita | G03G 15/01 358/1.9 |
| 2009/0310157 A1* | 12/2009 | Wada | H04N 1/6058 358/1.9 |
| 2012/0150471 A1* | 6/2012 | Muto | G01J 3/462 702/104 |
| 2013/0121566 A1* | 5/2013 | Paris | G06T 11/001 382/159 |
| 2015/0110398 A1* | 4/2015 | Totsuka | G06T 11/001 382/167 |
| 2016/0277644 A1* | 9/2016 | Fukase | H04N 1/6041 |
| 2017/0289408 A1* | 10/2017 | Morikawa | G06F 3/1219 |
| 2018/0108122 A1* | 4/2018 | Fukase | G06T 7/11 |
| 2018/0227463 A1* | 8/2018 | Fukase | H04N 1/6036 |
| 2019/0098177 A1* | 3/2019 | Yoshida | H04N 1/4057 |
| 2019/0132454 A1* | 5/2019 | Fukase | H04N 1/00045 |
| 2019/0152218 A1* | 5/2019 | Stein | B41J 2/0057 |

* cited by examiner

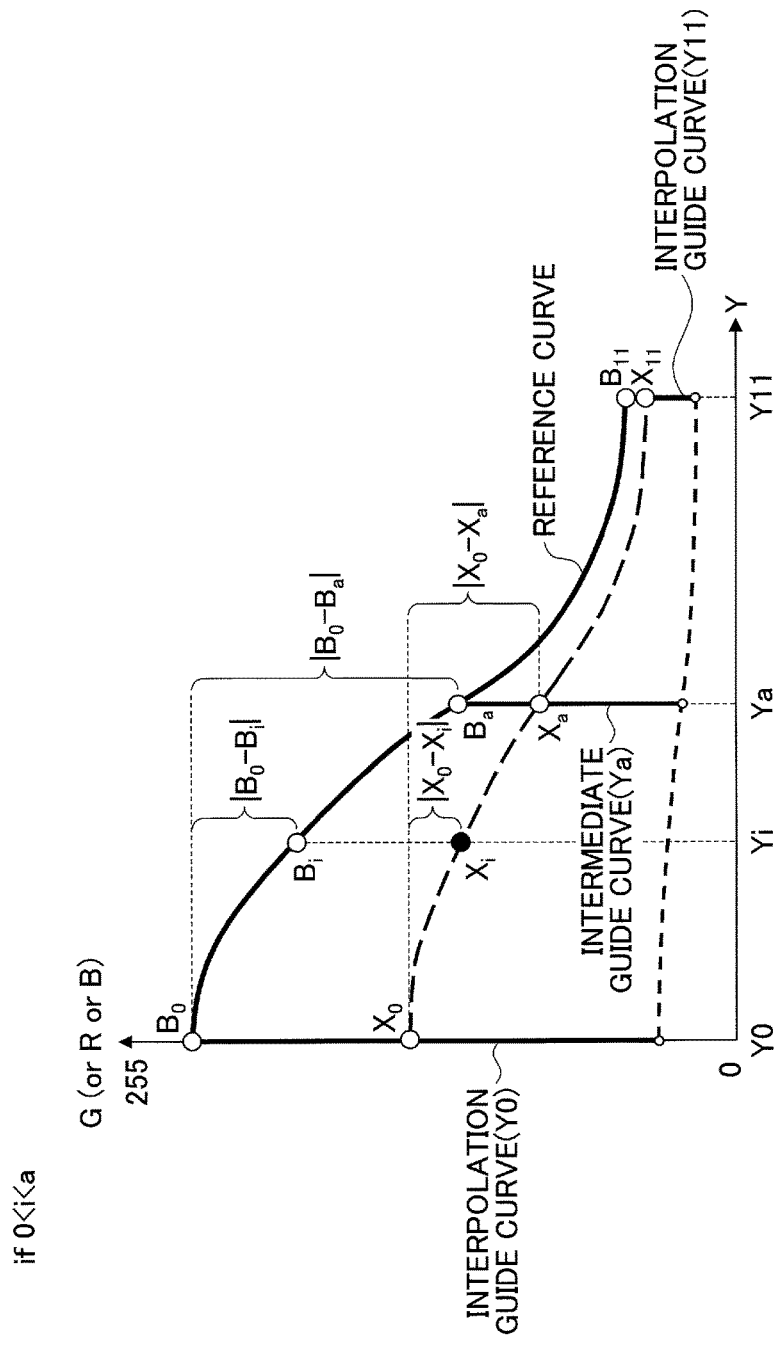

FIG.21
FIRST PAGE
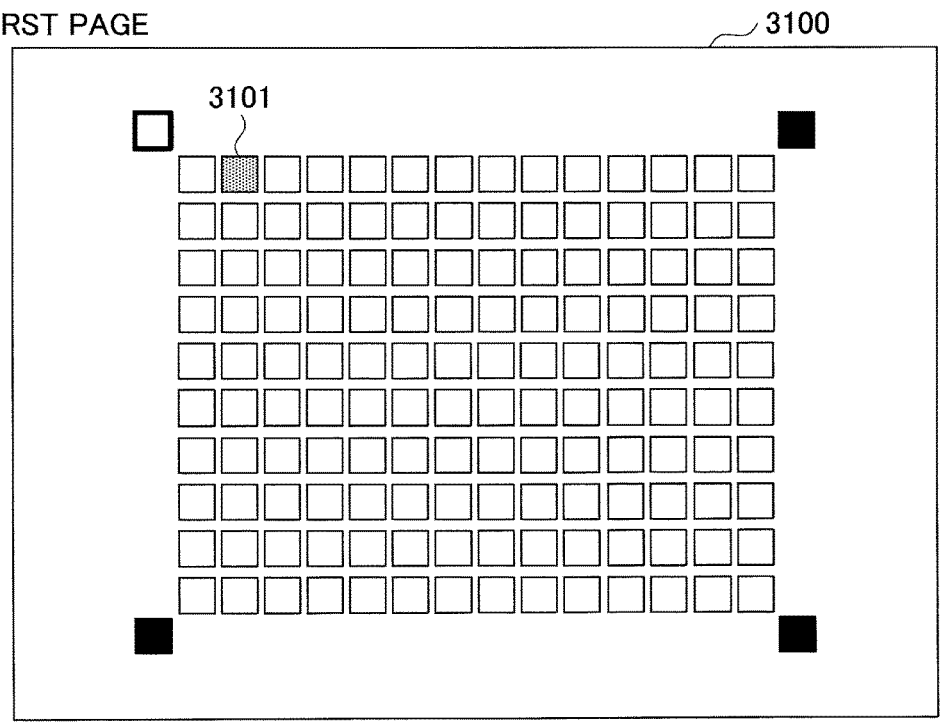
SECOND PAGE
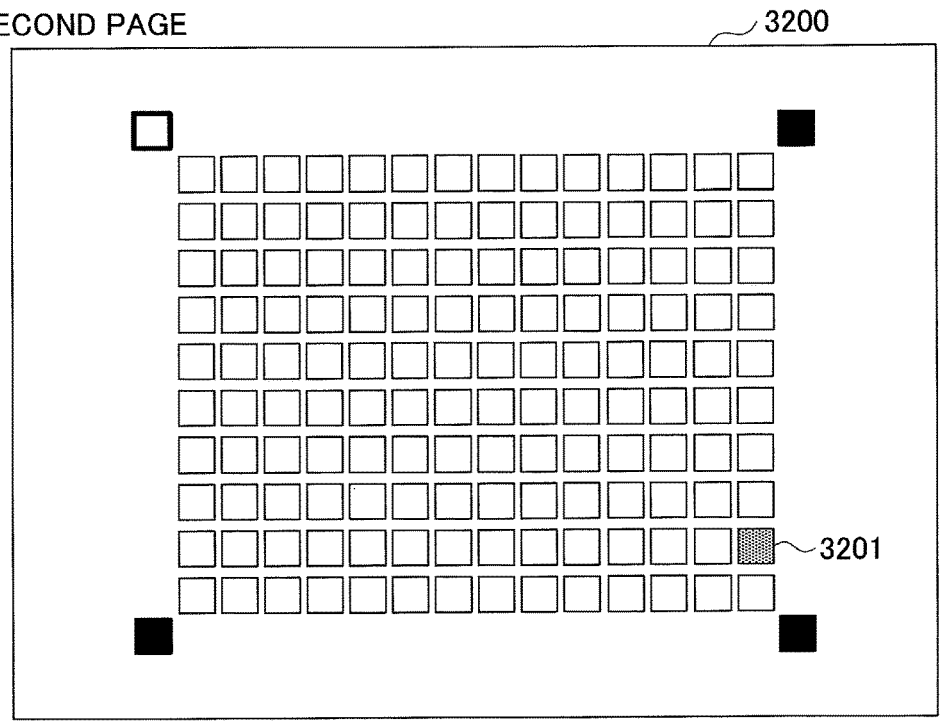

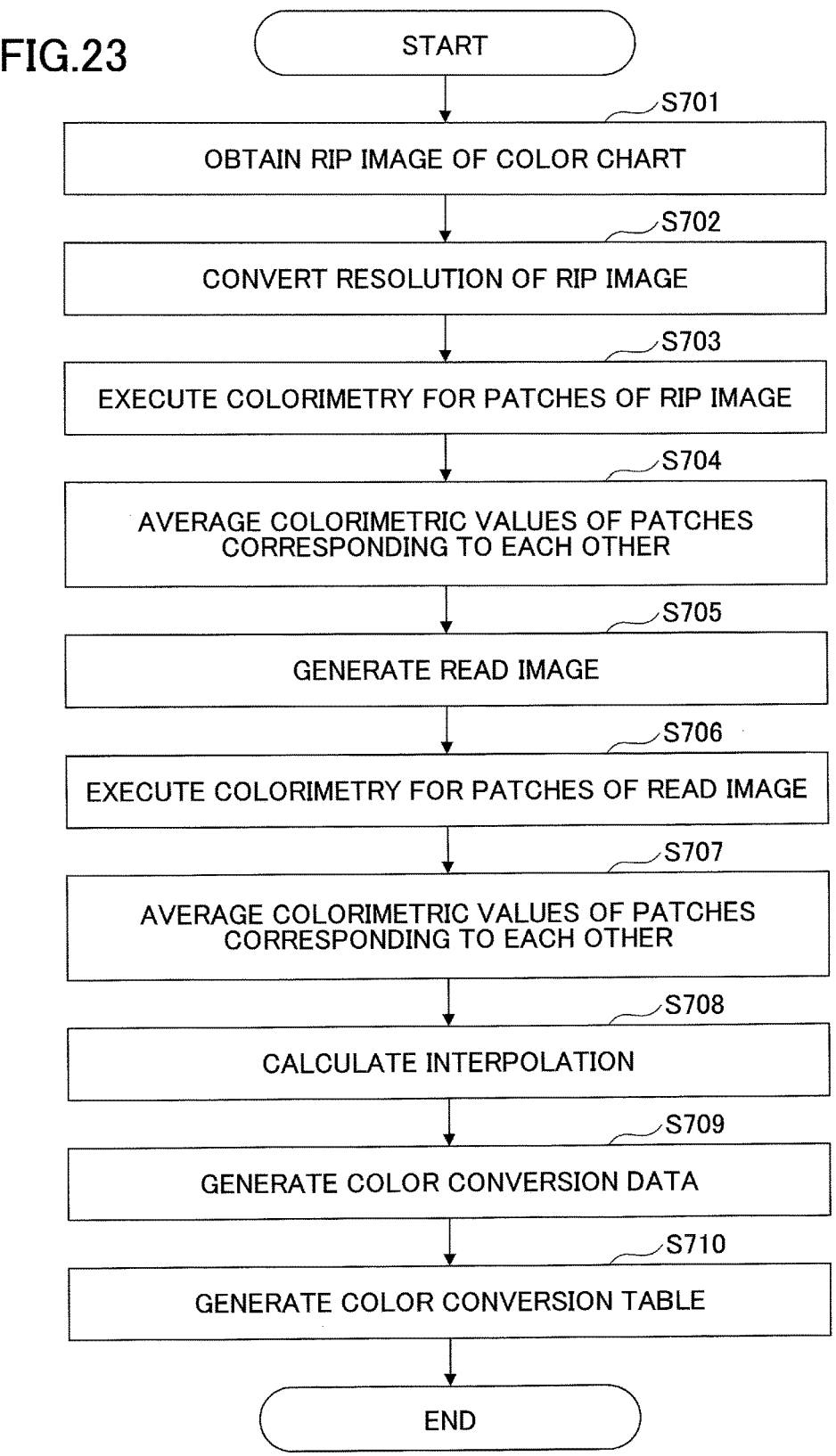

US 10,440,233 B2

IMAGE PROCESSING APPARATUS, IMAGE PROCESSING METHOD, AND MEDIUM

BACKGROUND OF THE INVENTION

1. Field of the Invention

The present disclosure relates to an image processing apparatus, an image processing method, and a medium.

2. Description of the Related Art

In production printing, it has been practiced to inspect the quality of printed matters output by printing devices. In such a quality inspection, the printed matters are inspected by comparing a reference image (or a master image) generated by converting an original image, with a read image generated by reading a printed matter output by a printing device with a scanner or the like (see, for example, Japanese Patent No. 6244944).

For conversion from an original image to a reference image, a color conversion table is used, in which color components in different color spaces are associated with each other. A color conversion table is generated, for example, by executing colorimetry on an image of a color chart on which color patches having predefined densities are arranged, and on a read image generated by reading a printed matter on which the image of the color chart has been printed, and associating the colorimetric values of the color patches corresponding to each other.

Here, a color chart is necessary to generate a color conversion table; and a technique on the color chart has been known in which color patches of approximate colors are arranged close to each other so that the color patches can be arranged efficiently (see, for example, Japanese Patent No. 5880997).

Meanwhile, a color space in general is multidimensional data including CMYK, RGB, and the like, and in order to generate a color conversion table with high accuracy, it is effective to execute colorimetry on a color chart in which not only color patches of primary colors but also color patches of mixed colors are arranged. However, in this case, many color patches are required, and the number of sheets of a color chart on which these color patches are arranged also increases.

SUMMARY OF THE INVENTION

According to an embodiment in the present disclosure, an image processing apparatus that generates color conversion data in which first color component values in a first color space are associated with second color component values in a second color space, the image processing apparatus includes a memory and at least one processor configured to execute: determining, as a reference curve, a curve taking a maximum value in the second color space among curves representing gradations of color components in the first color space; determining, as interpolation guide curves, curves representing a maximum gradation and a minimum gradation, respectively, of a color component to be interpolated among the color components in the first color space; executing colorimetry on color patches corresponding to second color component values included in the reference curve and on color patches corresponding to second color component values included in the interpolation guide curves; interpolating second color component values not included in the reference curve and the interpolation guide curves, based on the second color component values obtained by the colorimetry; and generating the color conversion data by using the second color component values obtained by the colorimetry and the second color component values interpolated by the interpolating.

BRIEF DESCRIPTION OF DRAWINGS

FIGS. 20A-20B are diagrams illustrating an example of interpolation calculation;

FIG. 21 is a diagram illustrating an example of a color chart in which color patches of the same color are arranged on different pages;

FIG. 23 is a flowchart illustrating an example of a process of generating a color conversion table according to the third embodiment.

DETAILED DESCRIPTION OF THE EMBODIMENTS

In the following, embodiments in the present disclosure (the embodiments) will be described in detail with reference to the drawings.

According to an embodiment in the present disclosure, it is possible to reduce the number of color patches.

First Embodiment

<Overall Configuration of Image Forming System 1>

Figure 1:
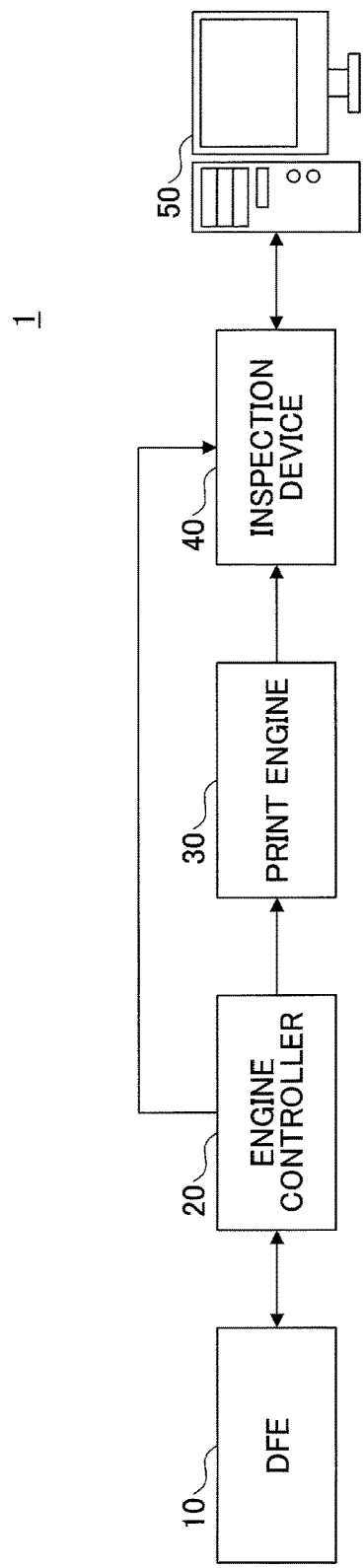
FIG. 1 is a diagram illustrating an example of an overall configuration of an image forming system according to a first embodiment.

First, an overall configuration of an image forming system 1 according to an embodiment will be described with reference to FIG. 1. FIG. 1 is a diagram illustrating an example of an overall configuration of the image forming system 1 according to a first embodiment.

As illustrated in FIG. 1, the image forming system 1 according to the embodiment includes a DFE (Digital Front End) 10, an engine controller 20, a print engine 30, an inspection device 40, and a user terminal 50.

The DFE 10 executes a RIP (Raster Image Processor) process based on a received print job, to generate image data to be printed (i.e., bitmap data), and to output the generated image data to the engine controller 20. In the following, bitmap data generated by the DFE 10 is also referred to as a "RIP image". Note that a print job is generated on a terminal device such as a PC (Personal Computer) operated by the user, and transmitted to the DFE 10.

Based on a RIP image received from the DFE 10, the engine controller 20 controls the print engine 30 to execute forming and outputting the image. Also, the engine controller 20 transmits the RIP image received from the DFE 10 to the inspection device 40.

The print engine 30 is an image forming apparatus that executes forming and outputting an image on a sheet as a recording medium based on a RIP image, under control of the engine controller 20. Note that as the recording medium, other than the sheet described above, a sheet-like material such as a film or plastic can be adopted as long as it is a material on which an image can be formed and output.

Based on a RIP image received from the engine controller 20, the inspection device 40 generates an image served as a reference (a reference image) for inspecting a result of image formation and output by the print engine 30. The inspection device 40 also generates a read image by reading a printing sheet (printed matter) as a result of the image formation and output by the print engine 30. Then, the inspection device 40 compares the reference image with the read image, to inspect the result of the image formation and output by the print engine 30.

Note that if having determined that there is a defect in the result of the image formation and output by the print engine 30, the inspection device 40 may indicate information on the page determined to have the defect to the engine controller 20. This causes the engine controller 20 to execute reprinting control of the page determined to have the defect so as to reprint the page determined to have the defect.

However, it is not necessary to reprint the page determined to have the defect. For example, the information on the page determined to have the defect may be displayed on the user terminal 50; alternatively, the engine controller 20, the inspection device 40, or the like may simply hold the information on the page determined to have the defect.

The user terminal 50 is, for example, an information processing terminal with which the user specifies parameters used for inspection and/or confirms an inspection result executed by the inspection device 40.

<Hardware Configuration of Inspection Device 40>

Figure 2:
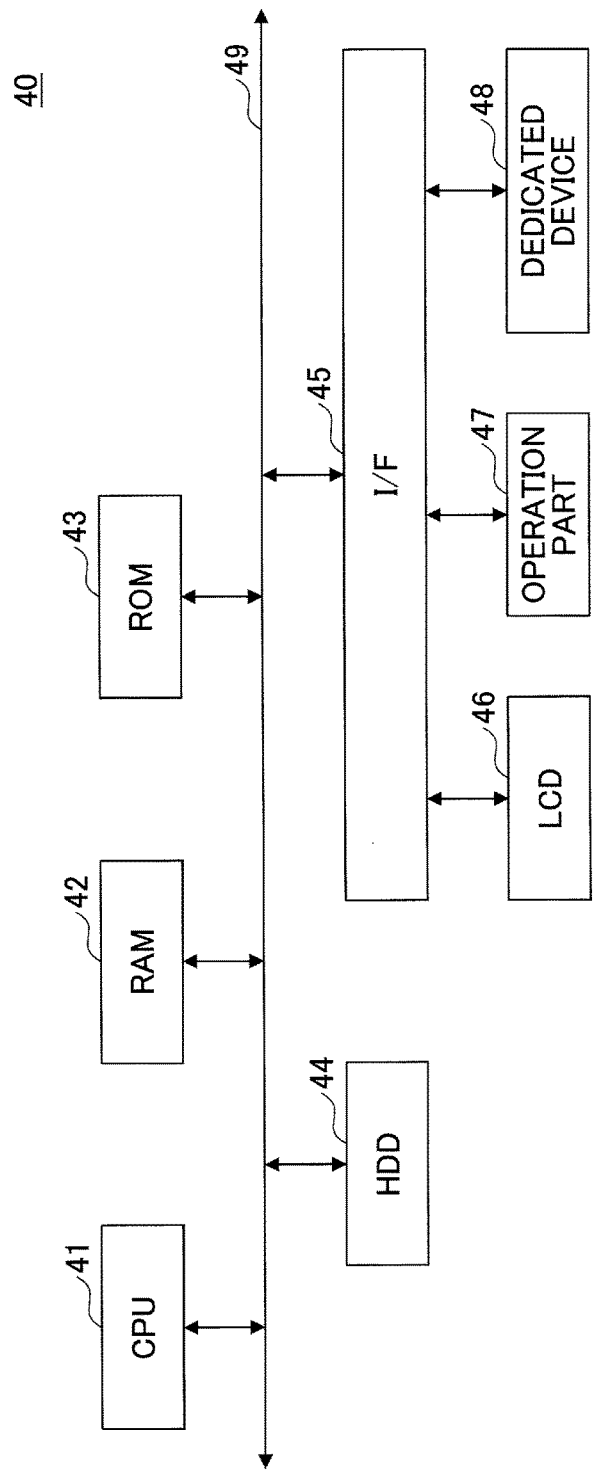
FIG. 2 is a diagram illustrating an example of a hardware configuration of an inspection device according to the first embodiment.

Next, a hardware configuration of the inspection device 40 according to an embodiment will be described with reference to FIG. 2. FIG. 2 is a diagram illustrating an example of a hardware configuration of the inspection device 40 according to the first embodiment.

As illustrated in FIG. 2, the inspection device 40 according to the embodiment has substantially the same hardware configuration as an information processing apparatus such as a general PC, server, or the like. In other words, the inspection device 40 according to the embodiment includes a CPU (Central Processing Unit) 41, a RAM (Random Access Memory) 42, a ROM (Read-Only Memory) 43, an HDD (Hard Disk Drive) 44, and an I/F (interface) 45. These components are connected via a bus 49. Also, the I/F 45 has an LCD (Liquid Crystal Display) 46, an operation part 47, and a dedicated device 48 connected.

The CPU 41 is an arithmetic/logic device that realizes control and functions of the entire inspection device 40 by reading programs and data from a storage device such as the ROM 43 and the HDD 44 onto the RAM 42 and executing processes. The RAM 42 is a volatile semiconductor memory that temporarily holds programs and data. The ROM 43 is a nonvolatile semiconductor memory capable of holding programs and data even when the power is turned off.

The HDD 44 is a nonvolatile storage device that stores programs and data. Programs and data stored in the HDD 44 include an OS (Operating System), which is basic software for controlling the entire inspection device 40, application software that provides various functions on the OS, and the like.

Note that the inspection device 40 may have a drive device (e.g., a solid state drive: SSD) that uses a flash memory as a storage medium instead of the HDD 44 or along with the HDD 44.

The I/F 45 is an interface for connecting the bus 49 with various hardware devices, networks, and the like. The LCD 46 is a user interface for the user to confirm processed results and the like of the inspection device 40. The operation part 47 is a user interface through which the user inputs various information items into the inspection device 40, which may include, for example, a keyboard and a mouse.

The dedicated device 48 is hardware for realizing a dedicated function. The dedicated device 48 includes an arithmetic/logic unit such as an ASIC (Application Specific Integrated Circuit) for executing image processing at a high speed, a reader for reading an image output on a sheet surface, and the like.

By having the hardware configuration illustrated in FIG. 2, the inspection device 40 according to the embodiment can realize various processes as will be described later.

<Mechanical Configuration of Print Engine 30 and Inspection Device 40 and Sheet Conveyance Path>

Figure 3:
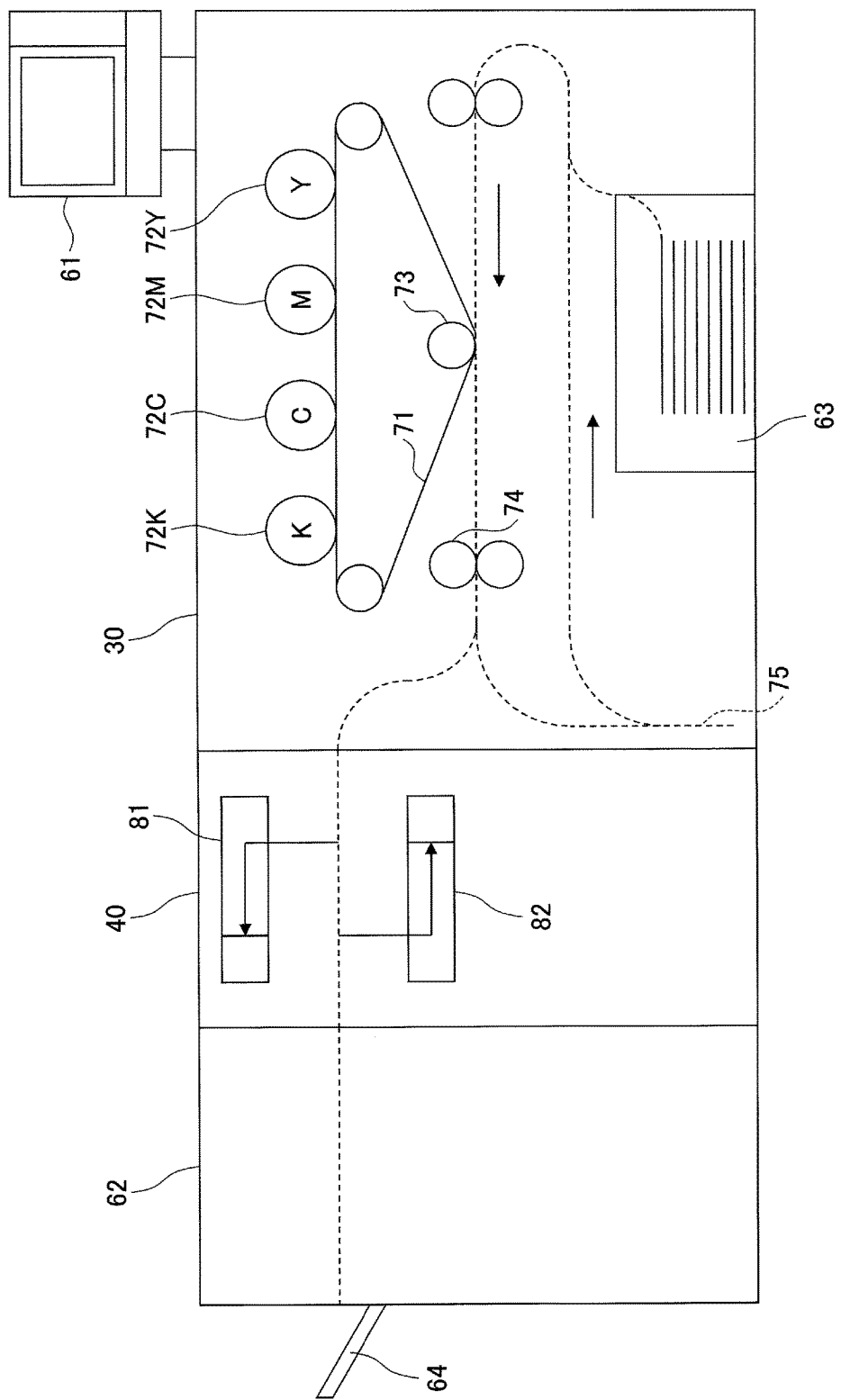
FIG. 3 is a diagram illustrating an example of a mechanical configuration of a print engine and an inspection device, and a sheet conveying path according to the first embodiment.

Next, a mechanical configuration of the print engine 30 and the inspection device 40, and a sheet conveyance path will be described according to the embodiment with reference to FIG. 3. FIG. 3 is a diagram illustrating an example of a mechanical configuration of the print engine 30 and the inspection device 40, and a sheet conveyance path according to the first embodiment.

As illustrated in FIG. 3, the print engine 30 according to the embodiment has an operating device 61 connected to provide a user interface. The print engine 30 has photosensitive drums 72Y, 72M, 72C, and 72K (simply referred to as "photosensitive drums 72" when not distinguishing the respective colors, below) of the respective colors arranged along a conveyance belt 71. In other words, along the conveyance belt 71, which is an intermediate transfer belt on which an intermediate transfer image is formed for transferring an image onto a sheet (an example of a recording medium) fed from a sheet feed tray 63, the photosensitive drums 72Y to 72K are arranged in this order from the upstream side in the conveyance direction of the conveyance belt 71.

Images of the respective colors developed by toners on the surfaces of the photosensitive drums 72 for the respective colors are superimposed and transferred onto the conveyance belt 71, so as to form a full-color image. The full-color image formed on the conveyance belt 71 is transferred onto the sheet surface of a sheet conveyed on the conveyance path, which is designated with dashed lines in FIG. 3, by a function of the transfer roller 73.

The sheet on which the image is formed on the sheet surface is further conveyed to have the image fixed by a fixing roller 74, and then, conveyed to the inspection device 40. In the case of duplex printing, a sheet having an image formed and fixed on one side is conveyed to a reversing path 75 to be reversed, and then, conveyed again to the transfer position by the transfer roller 73.

The reader device 81 reads the sheet surface of a sheet on the conveyance path inside the inspection device 40 to generate a read image. Note that in the case of duplex printing, both sides of a sheet are read by the reader devices 81 and 82, to generate read images.

Then, the sheet having the surface(s) read is further conveyed through the inside of the inspection device 40 to be conveyed to a stacker 62. Thereafter, the sheet conveyed to the stacker 62 is discharged to a paper ejection tray 64.

<Functional Configurations of Engine Controller 20, Print Engine 30, and Inspection Device 40>

Figure 4:
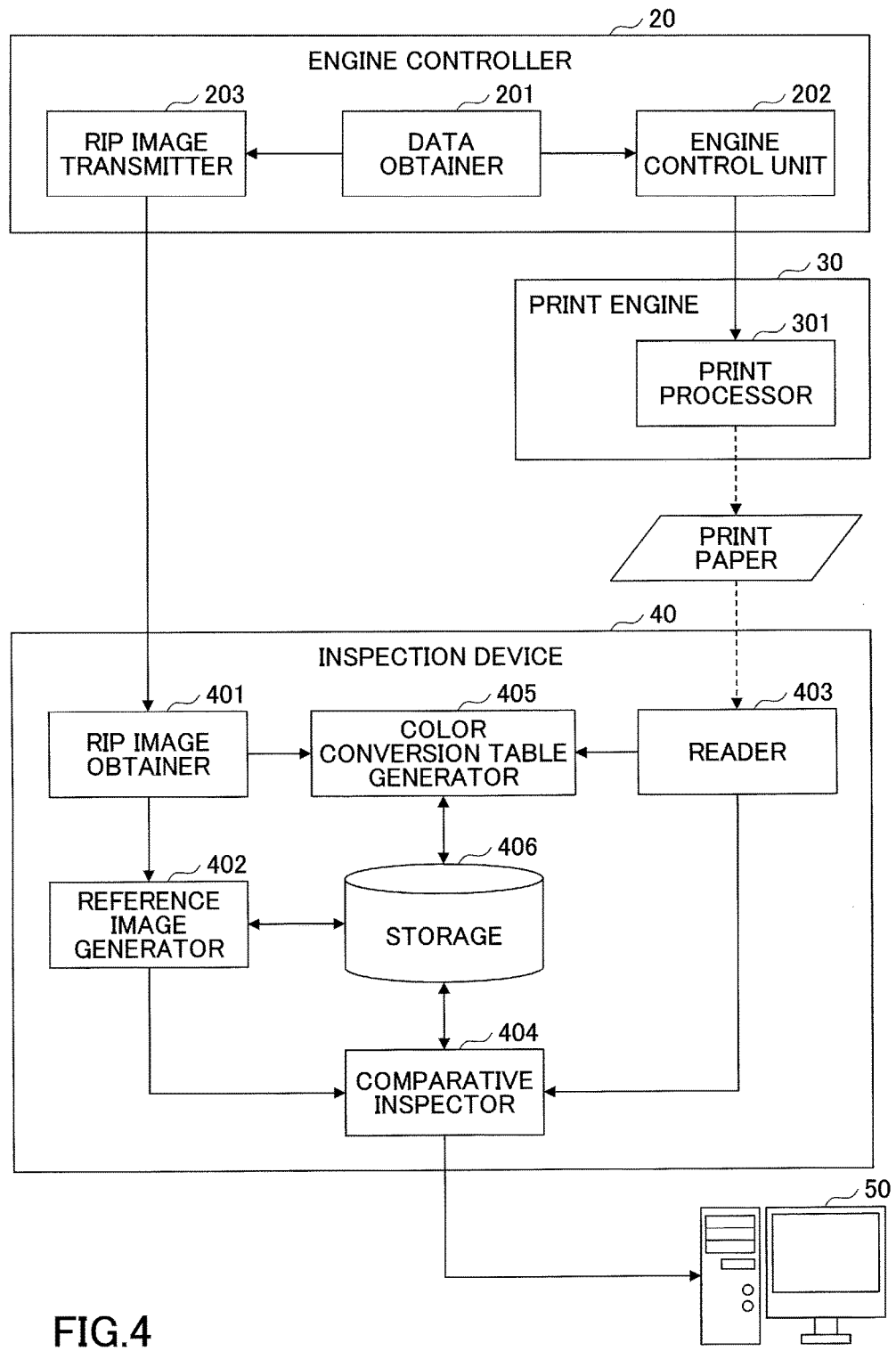
FIG. 4 is a diagram illustrating an example of a functional configuration of an engine controller, a print engine, and an inspection device according to the first embodiment.

Next, functional configurations of the engine controller 20, the print engine 30, and the inspection device 40 according to the embodiment will be described with reference to FIG. 4. FIG. 4 is a diagram illustrating an example of functional configurations of the engine controller 20, the print engine 30, and the inspection device 40 according to the first embodiment.

<<Engine Controller 20>>

As illustrated in FIG. 4, the engine controller 20 according to the embodiment includes a data obtainer 201, an engine control unit 202, and a RIP image transmitter 203. Each of these functional units is realized by a process that one or more programs installed in the engine controller 20 cause the CPU to execute.

The data obtainer 201 receives a RIP image from the DFE 10. Also, the data obtainer 201 outputs the received RIP image to the engine control unit 202 and the RIP image transmitter 203.

The engine control unit 202 causes the print engine 30 to execute forming and outputting the image based on the RIP image input from the data obtainer 201.

The RIP image transmitter 203 transmits the RIP image input from the data obtainer 201 to the inspection device 40. Note that at this time, the RIP image transmitter 203 may transmit job information together with the RIP image to the inspection device 40. The job information includes, for example, a job ID, print setting information, and the like.

<<Print Engine 30>>

As illustrated in FIG. 4, the print engine 30 according to the embodiment includes a print processor 301. This functional unit is realized by a process that one or more programs installed in the print engine 30 cause the CPU to execute.

The print processor 301 obtains a RIP image input from the engine controller 20 to execute forming and outputting the image on a sheet. Then, the print processor 301 outputs the sheet on which the image formation and output have been executed (i.e., a printing sheet having an image printed). Note that the print processor 301 according to the embodiment may be compatible with any method of image formation (e.g., an electrophotographic method, an ink-jet method, and the like).

<<Inspection Device 40>>

As illustrated in FIG. 4, the inspection device 40 according to the embodiment includes a RIP image obtainer 401, a reference image generator 402, a reader 403, a comparative inspector 404, and a color conversion table generator 405. Each of these functional units is realized by a process that one or more programs installed in the inspection device 40 cause the CPU to execute.

The inspection device 40 according to the embodiment also includes a storage 406. The storage 406 can be realized, for example, by using the HDD 44. Note that the storage 406 may be realized, for example, by using a storage device or the like connected to the inspection device 40 via a network.

The RIP image obtainer 401 receives a RIP image from the engine controller 20. Also, the RIP image obtainer 401 outputs the received RIP image to the reference image generator 402 or the color conversion table generator 405.

When inspecting a printing sheet, the RIP image obtainer 401 outputs the RIP image to the reference image generator 402. On the other hand, when generating a color conversion table, the RIP image obtainer 401 outputs the RIP image to the color conversion table generator 405. Note that when inspecting a printing sheet, the RIP image is an image obtained by applying a RIP process to an original image to be inspected. On the other hand, when generating a color conversion table, the RIP image is an image obtained by applying a RIP process to the original image of a color chart on which color patches are arranged (a color chart image).

A color conversion table is a table that stores color conversion data for converting a certain color space into another certain color space. Also, color conversion data is data in which color components in the certain color space is associated with color components of the other certain color space. Note that a color conversion table has been generated in advance and stored in the storage 406 before inspecting a printing sheet.

The reference image generator 402 generates a reference image from the RIP image input from the RIP image obtainer 401 and the color conversion table stored in the storage 406. Also, the reference image generator 402 outputs the generated reference image to the comparative inspector 404.

The reader 403 reads an image formed on the sheet surface of a printing sheet (i.e., a printing sheet on which an image is formed and output by the printing processor 301) output by the printing engine 30, to generate a read image. Also, the reader 403 outputs the read image to the comparative inspector 404 when inspecting a printing sheet. On the other hand, when generating a color conversion table, the reader 403 outputs the read image to the color conversion table generator 405. Note that the reader 403 is realized by, for example, the reader device 81, the reader device 82, and the like provided inside the inspection device 40.

The comparative inspector 404 inspects a printing sheet based on a reference image input by the reference image generator 402 and a read image input by the reader 403. In other words, the comparative inspector 404 generates, for example, a difference image representing the difference between the reference image and the read image, and based on the magnitude correlation between each pixel value of the difference image and a threshold value set in advance, to determine whether there is a defect in the read image. Then, the comparative inspector 404 transmits the determination result to the user terminal 50.

The color conversion table generator 405 generates a color conversion table from a RIP image input from the RIP image obtainer 401 and a read image input from the reader 403. Then, the color conversion table generator 405 stores the generated color conversion table in the storage 406. Note that the RIP image input at this time is a RIP image obtained by applying a RIP process to a color chart image. Similarly, the read image input at this time is an image generated by reading a printing sheet on which the RIP image has been formed and output.

Figure 5:
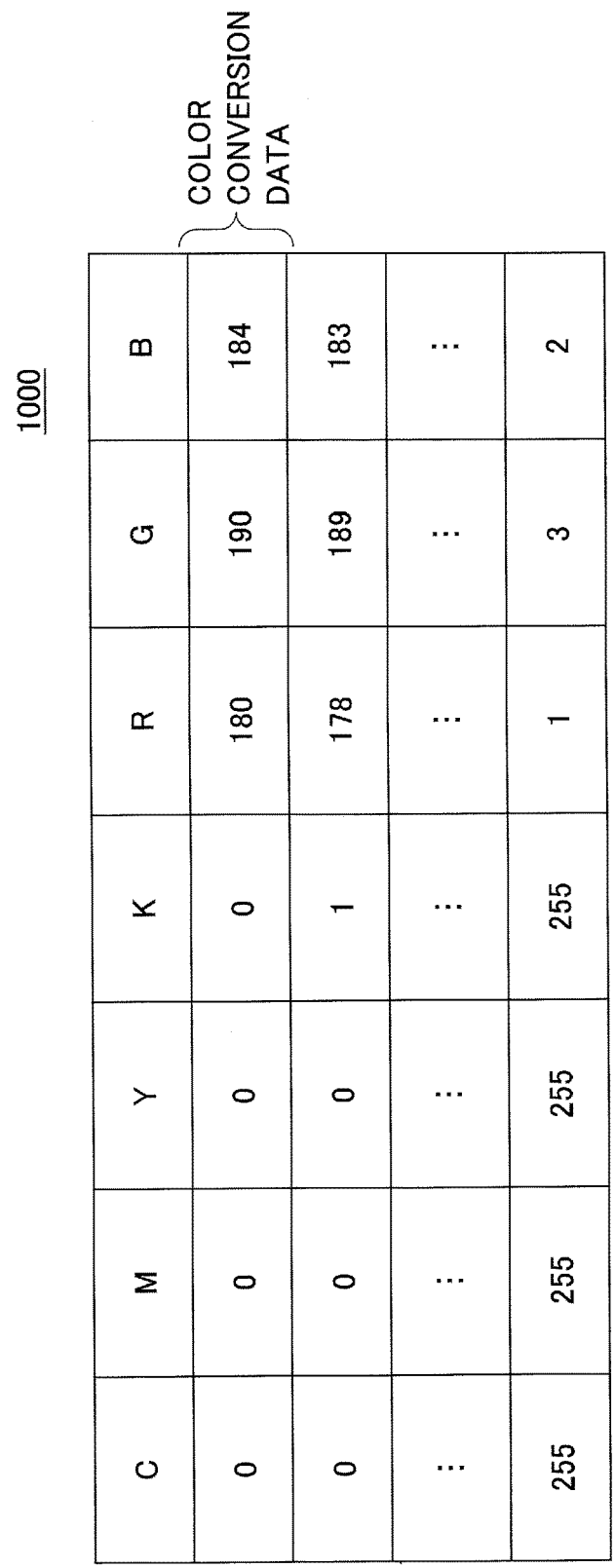
FIG. 5 is a diagram illustrating an example of a color conversion table.

Here, an example of a color conversion table generated by the color conversion table generator 405 will be described with reference to FIG. 5. FIG. 5 is a diagram illustrating an example of a color conversion table 1000.

The color conversion table 1000 illustrated in FIG. 5 is a color conversion table for executing color conversion from the CMYK color space in which each color component is represented with 8 bits into the RGB color space in which each color component is represented with 8 bits. In the color conversion table 1000 illustrated in FIG. 5, color conversion data is stored in which color components in the CMYK color space are associated with color components in the RGB color space.

In the color conversion table 1000 illustrated in FIG. 5, for example, a color conversion data item is stored in which a color of CMYK=(0, 0, 0, 0) is associated with a color of RGB=(180, 190, 184). Similarly, in the color conversion table 1000 illustrated in FIG. 5, for example, a color conversion data item is stored in which a color of CMYK=(0, 0, 0, 1) is associated with a color of RGB=(178, 189, 183).

In this way, a color conversion table stores color conversion data in which color components of a color space as the conversion source (the CMYK color space in the example illustrated in FIG. 5) are associated with color components of a color space as the conversion destination (the RGB color space in the example illustrated in FIG. 5).

Figure 6:
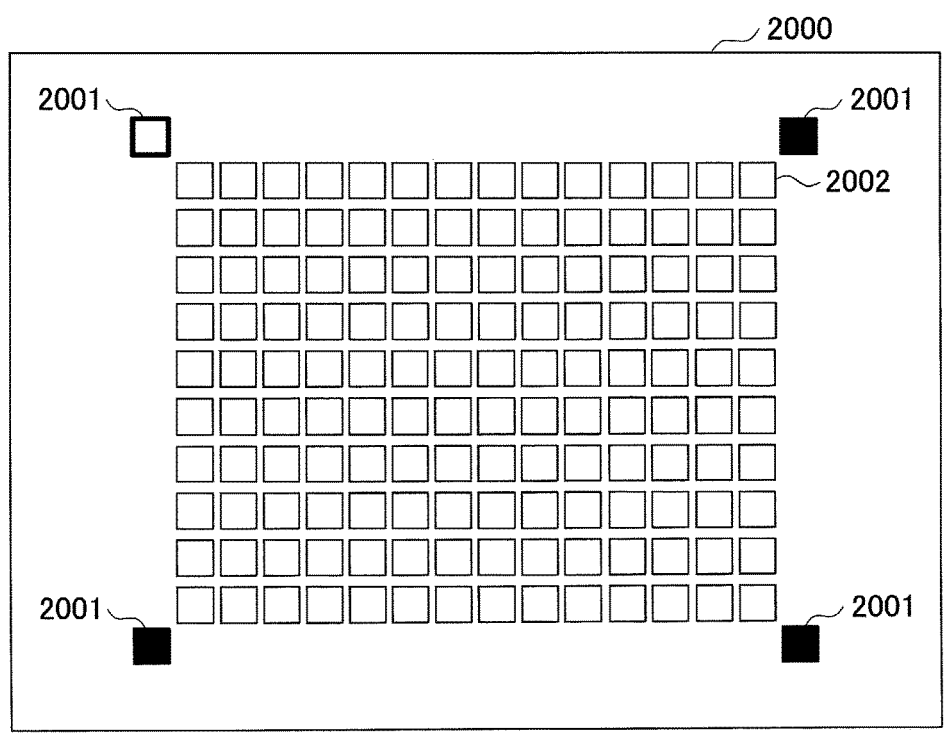
FIG. 6 is a diagram illustrating an example of a color chart.

Here, an example of a color chart on which color patches for generating color conversion data items are arranged is illustrated in FIG. 6. FIG. 6 is a diagram illustrating an example of a color chart 2000.

In the color chart 2000 illustrated in FIG. 6, markers 2001 serving as references for recognizing the position of a color patch are arranged at the four corners. One of these markers 2001 (a marker 2001 on the upper left in FIG. 6) has a pattern different from those of the other markers 2001 in order to recognize the orientation of the color chart.

Also, inside these markers 2001, multiple color patches 2002 are arranged in a lattice shape. In general, one color patch 2002 has an area of a certain size or greater (e.g., 5 mm×5 mm, etc.) with a uniform color, for example, in order to prevent a read error due to a noise or the like.

Figure 7:
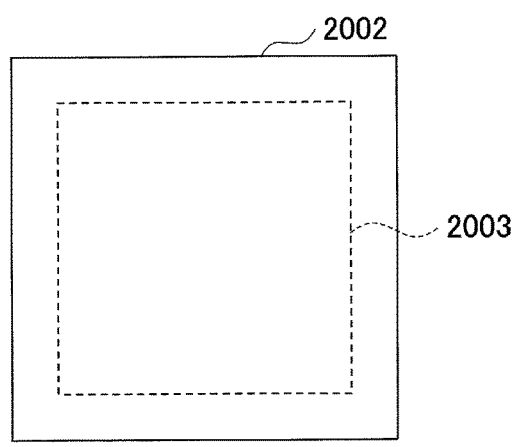
FIG. 7 is a diagram illustrating an example of colorimetry on color patches.

By executing colorimetry on these color patches 2002, colorimetric values for generating color conversion data are obtained. When executing colorimetry on these color patches 2002, for example, for each of the color patches 2002 whose position is identified by the markers 2001, as illustrated in FIG. 7, an average of pixel values in a certain colorimetric range 2003 (e.g., 30 pixels×30 pixels) is taken as the colorimetric value.

The number of colors of the color patches 2002 necessary to generate a color conversion table is determined by the number of sampling points that is derived from the number of gradations of the color depth, which depends on the curve characteristic of a color conversion. For example, if the curve characteristic of a color conversion is represented by a straight line, two points at both ends of the straight line are sufficient as the sampling points because interpolation can be executed between the sampling points. Therefore, in this case, the required number of colors of the color patches is 2^ (the dimensionality of the color space as the conversion source). On the other hand, for example, if the curve characteristic of a color conversion is represented by a curve, the inflection points of this curve are mainly sampled to execute interpolation between the sampling points. In this case, in general, sampling is often executed around ten points. Note that for the interpolation between the sampling points, linear interpolation, spline transformation, and the like are used.

In the embodiment, assuming that the curve characteristic of the color conversion is represented by a curve and the number of sampling point is 12 (i.e., each color component of the CMYK color space as the conversion source is divided into 12 gradations), the number of colors of the color patches 2002 necessary to generate a color conversion table is $12^4$=20,736 colors.

Here, for example, in the case of arranging color patches of 20,736 colors on a color chart having the size of A4 (210 mm×297 mm), and assuming the size of one color patch being 5 mm×5 mm, 20,736/((210/5)×(297/5))≈8.3. Thus, a color chart of at least nine pages is required. However, in practice, considering constraints such that areas are required to arrange the markers 2001 as described with FIG. 6; there are margin areas on which printing cannot be executed due to the structure of a printer; in order to reduce the influence of flare, color patches adjacent to each other need to be arranged so as to have a small color difference; and the like, the number of colors of color patches that can be arranged on one page in the color chart is further reduced.

For example, considering the constraints described above, if 1,728 colors are arranged per page in a color chart, the color chart needs 12 pages. In the embodiment, only some color patches of predetermined colors are arranged on a color chart, and colorimetry is executed only for these color patches of the predetermined colors. Then, the colorimetric values of color patches of the remaining colors are interpolated by calculation. Thus, in the embodiment, it is possible to reduce the number of colors of color patches arranged in a color chart, and to generate a color conversion table with a fewer number of pages.

Therefore, for example, it is possible to reduce the consumption of expendable items such as sheets and toners for generating a color conversion table, and to shorten the printing time. Also, for example, reducing the number of pages enables to reduce the probability of occurrence of an abnormality such as a paper jam. In particular, regarding the reduction of the number of sheets, when sheets to be used are more expensive, the monetary expenditure becomes lower.

Meanwhile, one may consider that the number of pages of a color chart may be reduced by decreasing the area of a color patch so as to increase the number of colors of the color patches that can be arranged on the color chart. However, considering the influence of various noises, flares, and the like generated during the process of printing and reading, in order to execute stable colorimetry, it is preferable that the area of a color patch is greater than or equal to a certain area (e.g., 5 mm×5 mm, etc.).

Figure 8:
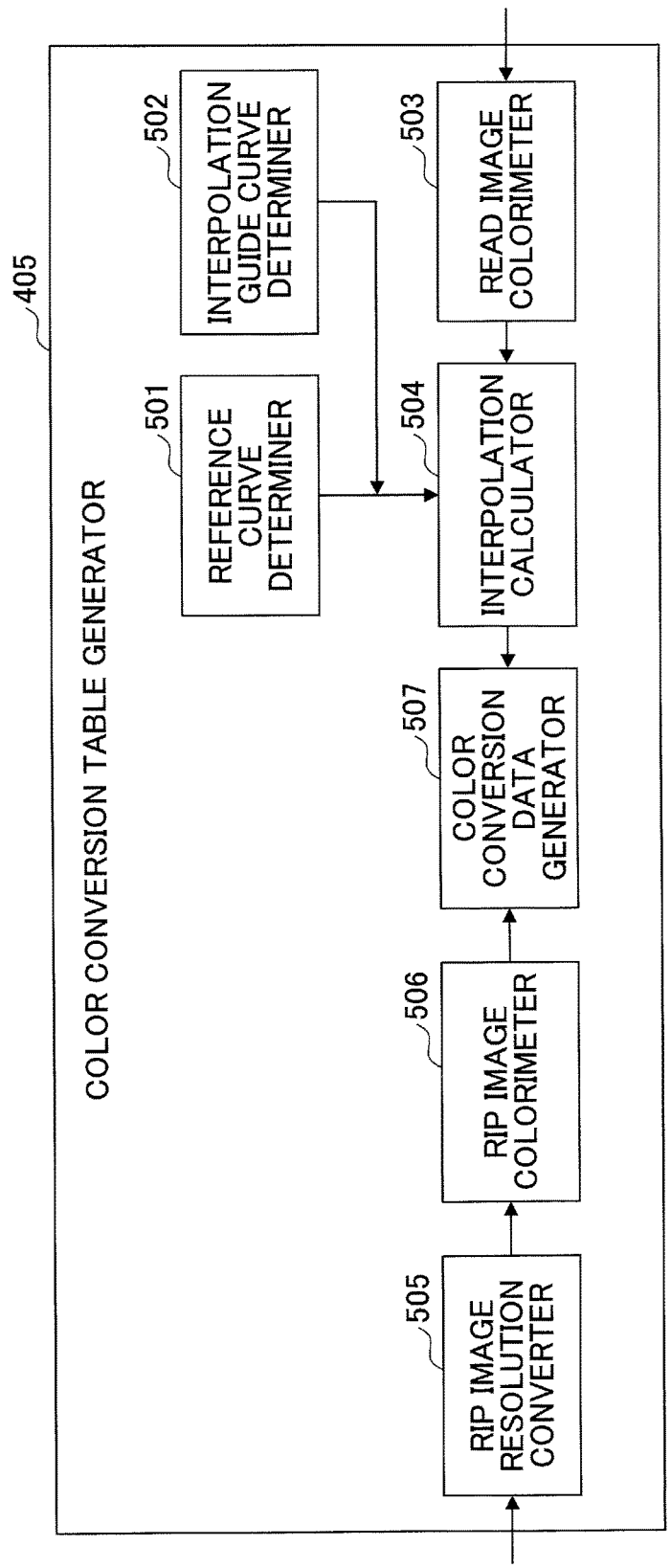
FIG. 8 is a diagram illustrating an example of a detailed functional configuration of a color conversion table generator according to the first embodiment.

Here, as mentioned above, a detailed functional configuration of the color conversion table generator 405 will be described with reference to FIG. 8 in the case where colorimetry is executed only for some color patches of predetermined colors and the color patches of the remaining colors are interpolated by calculation (interpolation calculation). FIG. 8 is a diagram illustrating an example of a detailed functional configuration of the color conversion table generator 405 according to the first embodiment.

As illustrated in FIG. 8, the color conversion table generator 405 according to the embodiment includes a reference curve determiner 501, an interpolation guide curve determiner 502, a read image colorimeter 503, an interpolation calculator 504, a RIP image resolution converter 505, a RIP image colorimeter 506, and a color conversion data generator 507.

The reference curve determiner 501 determines a reference curve used for the interpolation calculation. The reference curve is, among curves representing gradations of a color component taken as a reference in a color space as the conversion source, a curve representing a gradation with which a maximum of color component values is obtained in a color space as the conversion destination.

The interpolation guide curve determiner 502 determines interpolation guide curves used for interpolation calculation. The interpolation guide curve is a curve representing the maximum gradation and the minimum gradation of a color component to be interpolated in a color space as the conversion source.

In a color space as the conversion destination, colors on the reference curve and colors on the interpolation guide curves are colors whose color patches are subject to colorimetry. On the other hand, in the color space as the conversion destination, colors that are not on the reference curve and the interpolation guide curves are interpolated by the interpolation calculation. Therefore, in the embodiment, on a color chart, color patches corresponding to the colors on the reference curve and color patches corresponding to the colors on the interpolation guide curves are arranged.

The read image colorimeter 503 executes colorimetry on color patches on a read image obtained by reading a printing sheet on which an image obtained by applying a RIP process to a color chart image is formed and output.

The interpolation calculator 504 uses colorimetric values obtained by the colorimetry executed by the read image colorimeter 503, to interpolate colorimetric values of colors not on the reference curve and the interpolation guide curves by the interpolation calculation In the following, a colorimetric value interpolated by the interpolation calculation may also be referred to as an "interpolated value".

The RIP image resolution converter 505 converts the resolution of a RIP image obtained by applying a RIP process to a color chart image into the same resolution as that of the read image. However, the resolution of a RIP image is not necessarily converted into the same resolution as that of the read image; the resolutions may be different from each other. For example, the RIP image resolution converter 505 may convert the resolution of a RIP image into around 200 to 300 dpi regardless of the resolution of the read image.

The RIP image colorimeter 506 executes colorimetry on each color patch on a RIP image whose resolution has been converted by the RIP image resolution converter 505.

The color conversion data generator 507 uses colorimetric values obtained by the colorimetry executed by the RIP image colorimeter 506, colorimetric values obtained by the colorimetry executed by the read image colorimeter 503, and interpolated values interpolated by the interpolation calculator 504, to generate color conversion data.

In other words, for color patches corresponding to each other, the color conversion data generator 507 associates colorimetric values obtained by the colorimetry executed by the RIP image colorimeter 506 with colorimetric values obtained by the colorimetry executed by the read image colorimeter 503, to generate color conversion data. Also, the color conversion data generator 507 associates an interpolated value interpolated by the interpolation calculator 504 with a color component value corresponding to the interpolated value among the color component values of the conversion source, to generate color conversion data.

<Defect Inspection Process>

Figure 9:
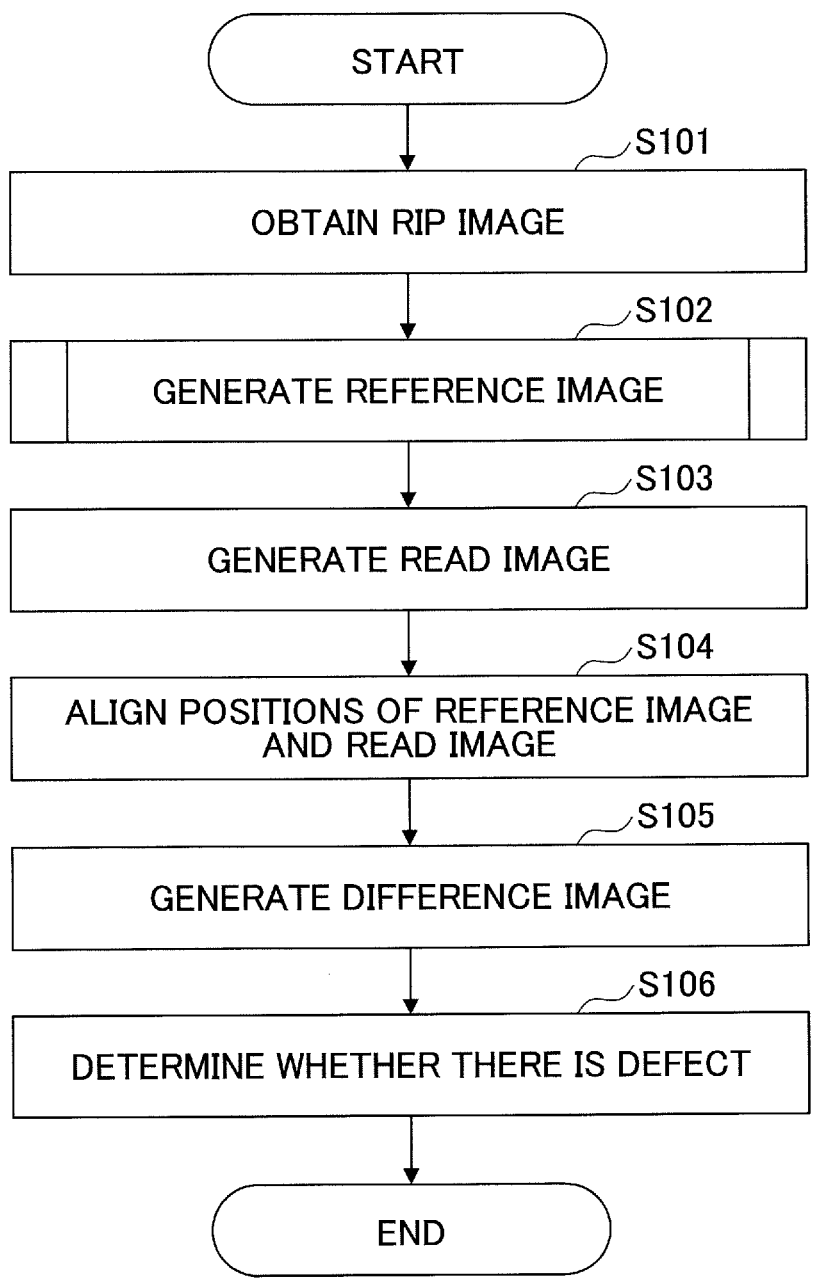
FIG. 9 is a flowchart illustrating an example of a defect inspection process according to the first embodiment.

In the following, a process of inspecting a printing sheet by using a color conversion table that has been generated in advance and stored in the storage 406 (defect inspection process) will be described with reference to FIG. 9. FIG. 9 is a flowchart illustrating an example of a defect inspection process according to the first embodiment. Note that in FIG. 9, as an example, assume that a RIP image is represented in the CMYK color space with 1 bit per pixel and 600 dpi, and a read image is represented in the RGB color space with 8 bits per pixel and 200 dpi.

First, the RIP image obtainer 401 receives a RIP image from the engine controller 20 (Step S101). Note that at this time, the RIP image is an image obtained by applying a RIP process to an original image to be inspected.

Next, the reference image generator 402 generates a reference image from the RIP image input from the RIP image obtainer 401 and the color conversion table stored in the storage 406 (Step S102).

Figure 10:
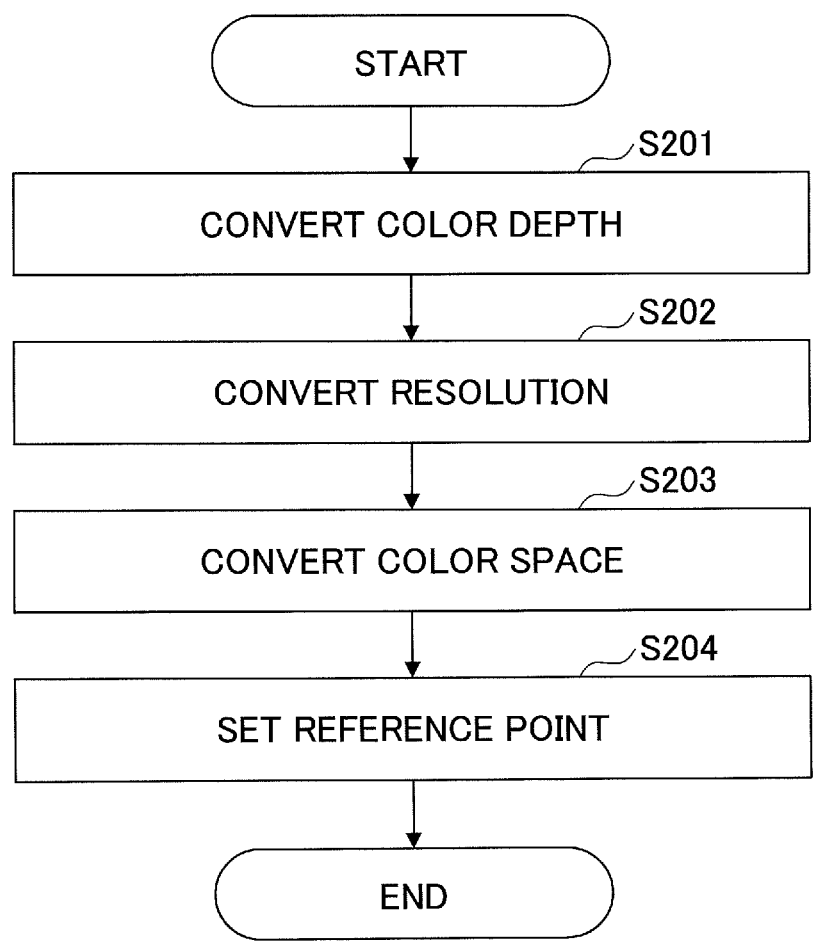
FIG. 10 is a flowchart illustrating an example of a process of generating a reference image according to the first embodiment.

Here, the process of generating a reference image at Step S102 will be described in detail with reference to FIG. 10. FIG. 10 is a flowchart illustrating an example of the process of generating a reference image according to the first embodiment.

First, the reference image generator 402 converts the color depth of each pixel of the RIP image into 8 bits (Step S201).

Next, the reference image generator 402 converts the resolution of the RIP image into 200 dpi, which is the same resolution as that of the read image (Step S202).

Next, the reference image generator 402 converts the color space of the RIP image from the CMYK color space into the RGB color space by using the color conversion table stored in the storage 406 (Step S203).

Next, the reference image generator 402 sets a reference point in the RIP image (Step S204). Thus, a reference image is generated. Note that the reference point is a point served as a reference for aligning the positions of the reference image and the read image.

Referring back to FIG. 9, following Step S102, the reader 403 reads an image formed on the sheet surface of a printing sheet output by the print engine 30, to generate a read image (Step S103).

Note that at this time, the printing sheet has an image formed on the sheet surface where the image has been obtained by applying a RIP process to an original image to be inspected.

Next, the comparative inspector 404 aligns the positions between the reference image generated at Step S102 and the read image generated at Step S103 (Step S104).

Next, the comparative inspector 404 generates a difference image between the reference image and the read image whose positions have been aligned at Step S104 (Step S105). In other words, the comparative inspector 404 generates a difference image in which the pixel value of each pixel represents a difference between the corresponding pixels.

Next, the comparative inspector 404 determines whether or not there is a defect (Step S106). In other words, the comparative inspector 404 determines whether or not there is a defect in the read image, for example, based on the magnitude relation between each pixel value of the difference image and a threshold value set in advance. Then, the comparative inspector 404 transmits the determination result to the user terminal 50. Note that, for example, if the original image consists of multiple pages, the above process of Steps S101 to S106 may be repeated in units of pages.

<Interpolation of Colorimetric Value>

In the following, as an example, interpolation of colorimetric values will be described in the case where each color component in the CMYK color space as the conversion source is divided into 12 gradations, and the conversion destination is the RGB color space. In the following, a color component may also be referred to as a "channel". Further, a certain gradation s ($0 \leq s \leq 11$) in a certain channel will be denoted as "(channel name)s". For example, the fifth gradation of a channel name "cyan" is denoted as "C4", the twelfth gradation of a channel name "key plate" is denoted as "K11", and so on.

Figure 11A:
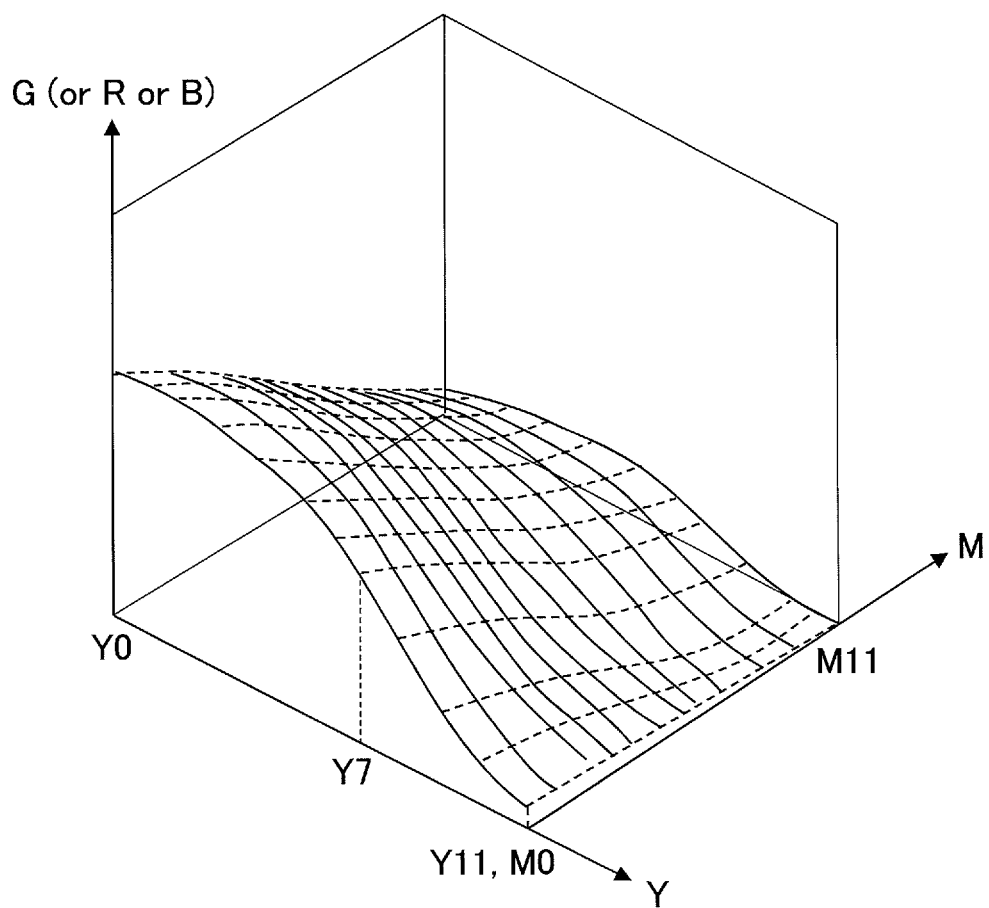
FIGS. 11A-11B are diagrams illustrating an example of interpolation of colorimetric values.

Here, for example, in the case where an arbitrary gradation Cn of cyan and an arbitrary gradation Km of the key plate are fixed, a graph (a curved surface) illustrated in FIG. 11A represents a relationship among yellow (Y), magenta (M), an arbitrary channel in the RGB color space (one of the channels among R, G and B). In the following, as an example, assume that the arbitrary channel in the RGB color space is green (G).

Figure 11B:
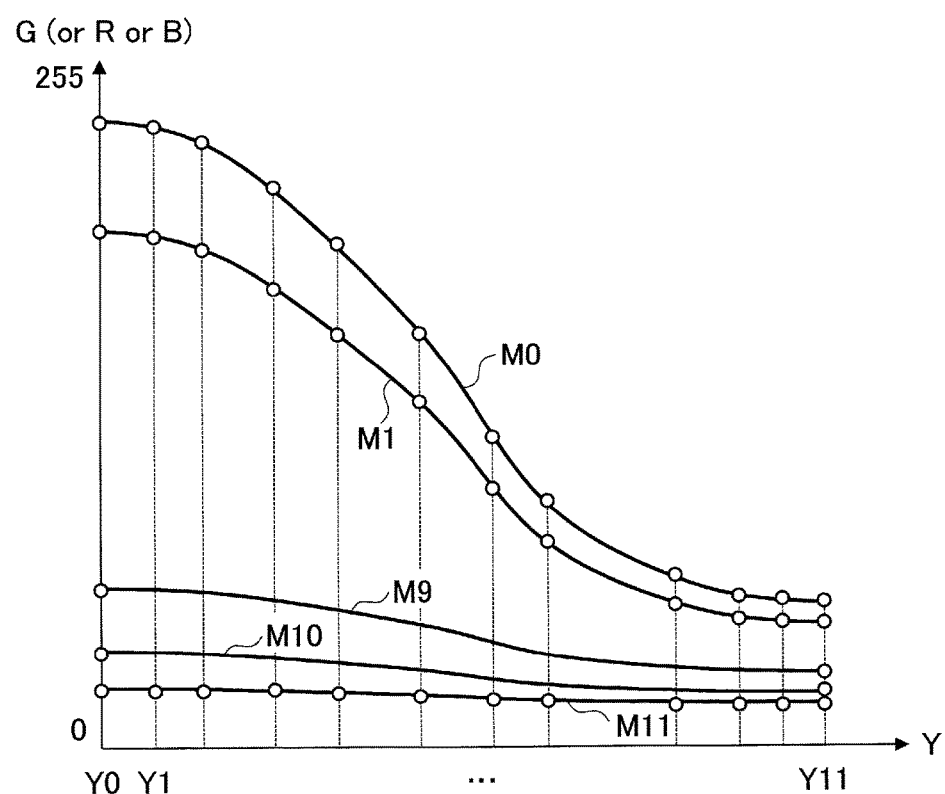

At this time, for example, a graph (curves) is illustrated in FIG. 11B where each of the curves represents a corresponding one of the gradations of magenta (M) when the graph illustrated in FIG. 11A is projected onto the Y-G plane. As illustrated in FIG. 11B, the curves represented by M0 to M11 are almost similar to each other. In the embodiment, colorimetric values are interpolated by using these characteristics.

In other words, for example, by using the curve denoted by M0 and colorimetric values at both ends (Y0 and Y11) of the curves represented by M1 to M11, respectively, colorimetric values (e.g., values of the channel G) on the intermediate gradations (Y1 to Y10) of the respective curves M1 to M11 representing the above characteristics are interpolated (these curves are also referred to as "interpolation curves"). Note that the curve denoted by M0 is a reference curve, and the curves represented by the values of the channel G (or the values of the channel R or B) in M1 to M11 at Y0 and Y11 are respective interpolation guide curves.

<Process for Determining Reference Curve and Interpolation Guide Curves>

Figure 12:
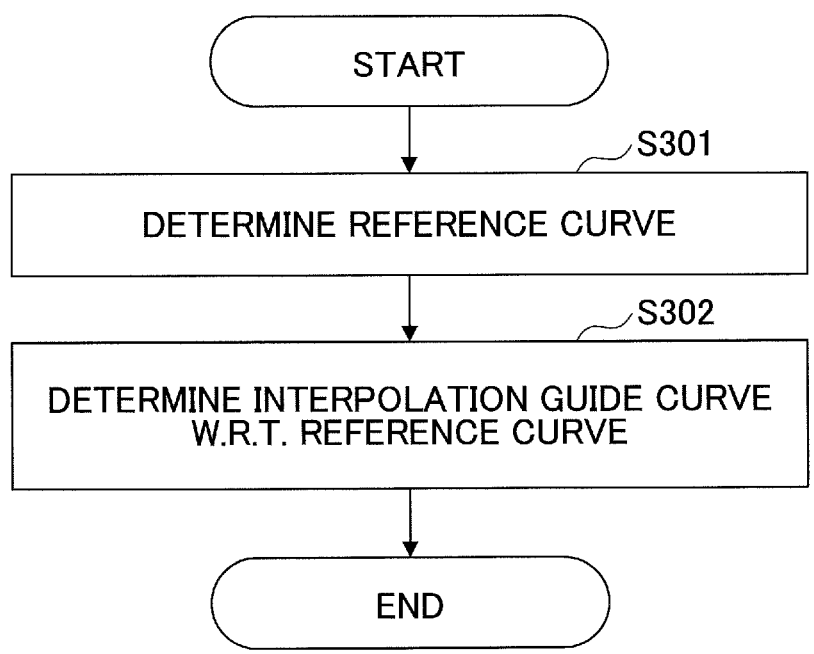
FIG. 12 is a flowchart illustrating an example of a process of determining a reference curve and interpolation guide curves according to the first embodiment.

In the following, a process of determining a reference curve and interpolation guide curves will be described with reference to FIG. 12. FIG. 12 is a flowchart illustrating an example of a process of determining a reference curve and interpolation guide curves according to the first embodiment. The process of determining a reference curve and interpolation guide curves illustrated in FIG. 12 is executed, for example, before generating a color chart. Note that in the following, similarly to the above, assume that each color component in the CMYK color space as the conversion source is divided into 12 gradations and the conversion destination is the RGB color space.

First, the reference curve determiner 501 determines a curve in which a maximum value of color component values in the conversion destination is obtained as the reference curve (Step S301). For example, if the graph (curved surface) illustrated in FIG. 11A is obtained, the reference curve determiner 501 sets a curve on which the maximum value of the channel G (or the maximum value of the channel R or B) is obtained (i.e., the curve denoted by M0 or the curve denoted by Y0) as the reference curve. Using a curve on which the maximum value of the channel G (or the maximum value of the channel R or B) is obtained as the reference curve enables to reduce the error of an interpolated value.

Figure 13:
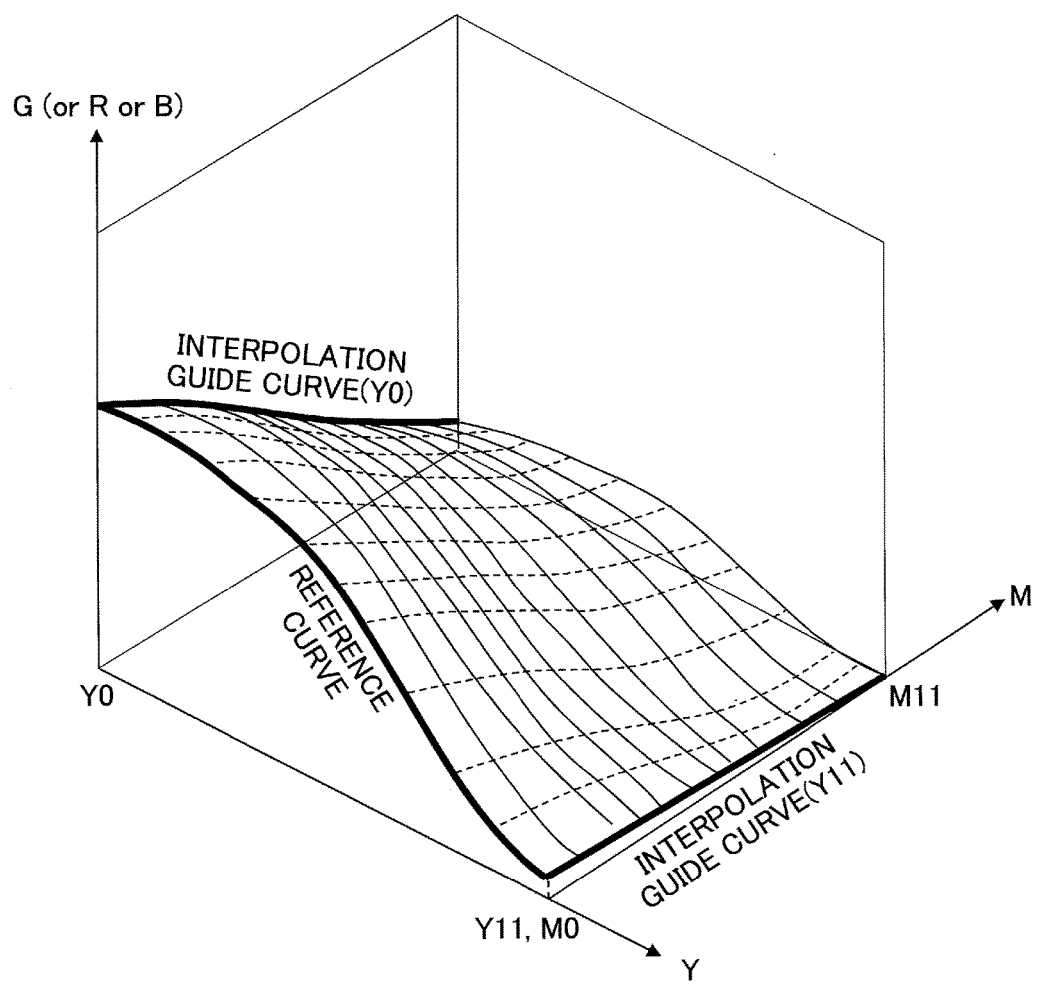
FIG. 13 is a diagram illustrating an example of determination of a reference curve and interpolation guide curves.

In the following, as illustrated in FIG. 13, assume that the curve denoted by M0 has been determined as the reference curve. In this case, colorimetric values (colorimetric values in the destination color space) for the intermediate gradations of yellow (Y) are interpolated. Note that it is also possible to determine the curve denoted by Y0 as the reference curve. In this case, the colorimetric values (colorimetric values in the destination color space) for the intermediate gradations of magenta (M) are interpolated.

However, the relative luminous efficiency of the human being is less sensitive in yellow (Y) than in the other color components (C, M, and K) and is also less sensitive to a change in yellow. Therefore, as the color component whose colorimetric values (colorimetric values in the destination color space) are interpolated with respect to the intermediate gradations, it is preferable to set yellow (Y) among magenta (M) and yellow (Y) (i.e., as the color components to be interpolated). Therefore, it is preferable to set the curve denoted by M0 as the reference curve.

Next, the interpolation guide curve determiner 502 determines curves represented by the maximum gradation and the minimum gradation of the color component to be interpolated as the interpolation guide curves (Step S302). For example, in the case where the graph (curved surface) illustrated in FIG. 11A has been obtained, the interpolation guide curve determiner 502 sets the curve denoted by Y0 and the curve denoted by Y11 as the interpolation guide curves as illustrated in FIG. 13.

As above, the reference curve and the interpolation guide curves are determined. In the embodiment, colorimetry on color patches is actually executed only colors on the reference curve and the interpolation guide curves, and for the other colors, colorimetric values are interpolated by the interpolation calculation. For example, in the example illustrated in FIG. 13, when the gradations of cyan (C) and key plate (K) are fixed to arbitrary gradations, respectively, colorimetry is executed on color patches of Y0 to Y11 in M0, M1 to M11 in Y0, M1 to M11 in Y11, to obtain the color component values (colorimetric values) of the RGB color space. On the other hand, for the other colors (Y1 to Y10 in each of M1 to M11), color component values (colorimetric values) in the RGB color space are interpolated by the interpolation calculation. In other words, among the color components of the color space as the conversion source, the colorimetric values for the intermediate gradations (Y1 to Y10) of the color component (yellow (Y)) are interpolated (i.e., the color component values in the intermediate gradations on the interpolation curves are interpolated). Thus, in the embodiment, it is sufficient to arrange only color patches for obtaining the color component values on the reference curve and on the interpolation guide curves (color component values in the destination color space), which enables to reduce the number of colors whose color patches are arranged on a color chart.

<Process of Generating Color Conversion Table>

Figure 14:
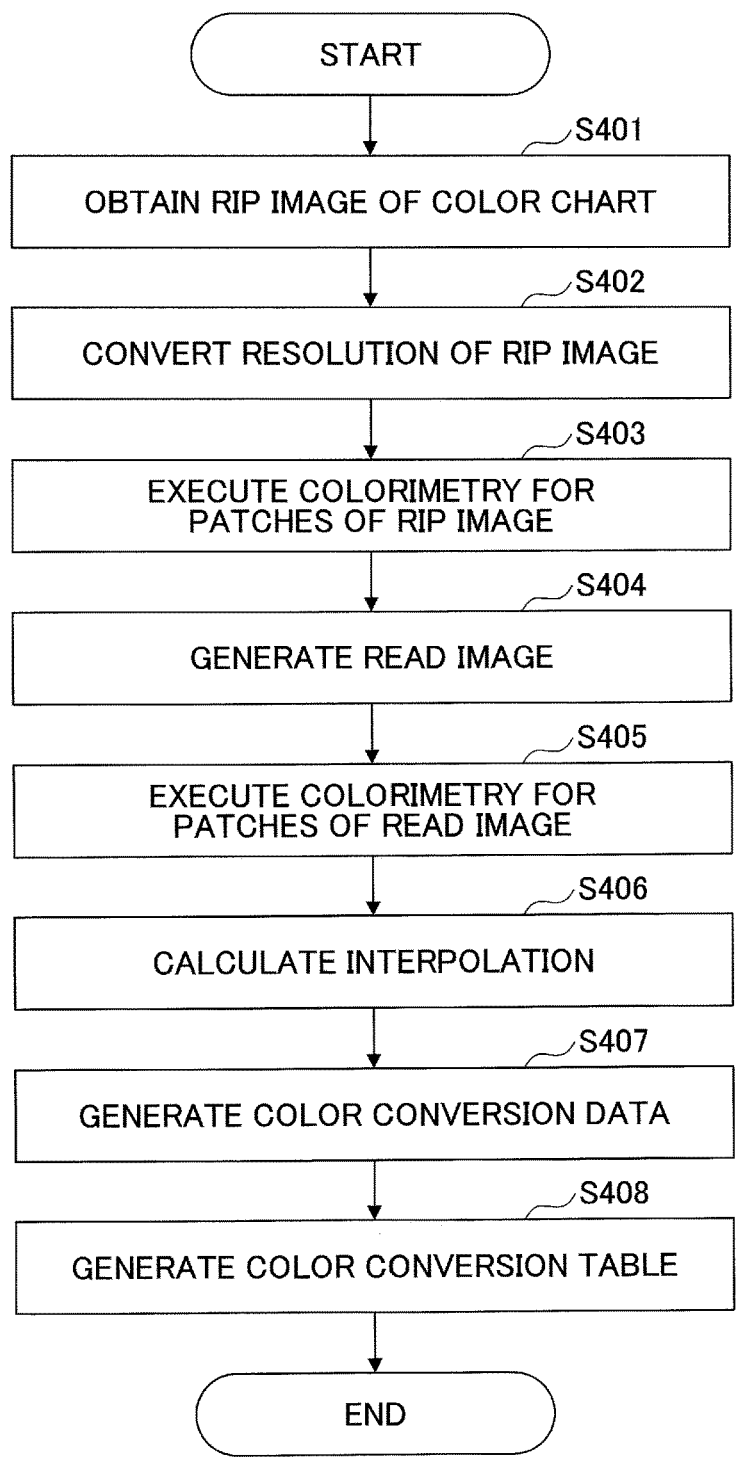
FIG. 14 is a flowchart illustrating an example of a process of generating a color conversion table according to the first embodiment.

In the following, a process of generating a color conversion table will be described with reference to FIG. 14. FIG. 14 is a flowchart illustrating an example of a process of generating a color conversion table according to the first embodiment. Note that in the following, similarly to the above, assume that each color component of the CMYK color space as the conversion source is divided into 12 gradations and the conversion destination is the RGB color space.

First, the RIP image obtainer 401 receives a RIP image from the engine controller 20 (Step S401). Note that at this time, the RIP image is an image obtained applying a RIP process to an original image of a color chart (a color chart image) on which only color patches for obtaining color component values on the reference curve and the interpolation guide curves (color component values in the conversion destination color space) are arranged.

Next, the RIP image resolution converter 505 converts the resolution of the RIP image obtained by the RIP image obtainer 401 into the same resolution as that of the read image (Step S402). For example, when the resolution of the RIP image is 600 dpi and the resolution of the read image is 200 dpi, the RIP image resolution converter 505 converts the resolution of the RIP image into 200 dpi.

Next, the RIP image colorimeter 506 executes colorimetry on each of the color patches on the RIP image whose resolution has been converted by the RIP image resolution converter 505 (Step S403). As a result, the color component values in the CMYK color space of each color patch are obtained. Note that these color component values are color component values which are on the reference curve or the interpolation guide curves in the RGB color space as the conversion destination.

Next, the reader 403 reads an image formed on the sheet surface of a printing sheet output by the print engine 30, to generate a read image (Step S404). Note that at this time, on the printing sheet, an image obtained by applying a RIP process to the color chart image is formed on the sheet surface.

Next, the read image colorimeter 503 executes colorimetry on each of the color patches on the read image obtained by reading the printing sheet (Step S405). As a result, the color component values in the RGB color space of each color patch are obtained. These color component values are color component values on the reference curve or the interpolation guide curves.

Next, the interpolation calculator 504 uses the colorimetric values obtained by the colorimetry executed by the read image colorimeter 503, to interpolate colorimetric values of colors not on the reference curve and the interpolation guide curves by the interpolation calculation, so as to obtain the interpolated values (Step S406).

Here, for example, in the case where an arbitrary gradation Cn of cyan and an arbitrary gradation Km of the key plate are fixed, an interpolated value $X_i$ in a color patch of an arbitrary gradation CnMxYiKm ($x \neq 0$, $i \neq 0$, $i \neq 11$) is obtained by the following Expression 1 where $X_i$ is a color component value of one of R, G, and B in the RGB color space.

$$X_i = X_0 - \frac{B_0 - B_i}{B_0 - B_{11}} \times (X_0 - X_{11}) \qquad \text{(Expression 1)}$$

However, if $B_0 = B_{11}$, the above Expression 1 is not used; instead, it is assumed that $X_i = X_{11}$ if $(0+11)/2 < i$, or $X_i = X_0$ if $(0+11)/2 \geq i$.

Here, $B_0$ is a colorimetric value of the color patch of a gradation CnM0Y0Km (a color component value of one of R, G, and B in the RGB color space). This $B_0$ is a color component value on the reference curve, which is obtained at the above Step S405.

Also, $B_{11}$ is a colorimetric value of the color patch of a gradation CnM0Y11Km (a color component value of one of R, G, and B in the RGB color space). This $B_{11}$ is a color component value on the reference curve, which is obtained at the above Step S405.

Also, $B_i$ is a colorimetric value of the color patch of a gradation CnM0YiKm (a color component value of one of R, G, and B in the RGB color space). This $B_i$ is a color component value on the reference curve, which is obtained at the above Step S405.

Also, $X_0$ is a colorimetric value of the color patch of a gradation CnMxY0Km (a color component value of one of R, G, and B in the RGB color space). This $X_0$ is a color component value on one of the interpolation guide curves, which is obtained at the above Step S405.

Also, $X_{11}$ is a colorimetric value of the color patch of a gradation CnMxY11Km (a color component value of one of R, G, and B in the RGB color space). This $X_{11}$ is a color component value on one of the interpolation guide curves, which is obtained at the above Step S405.

Figure 15:
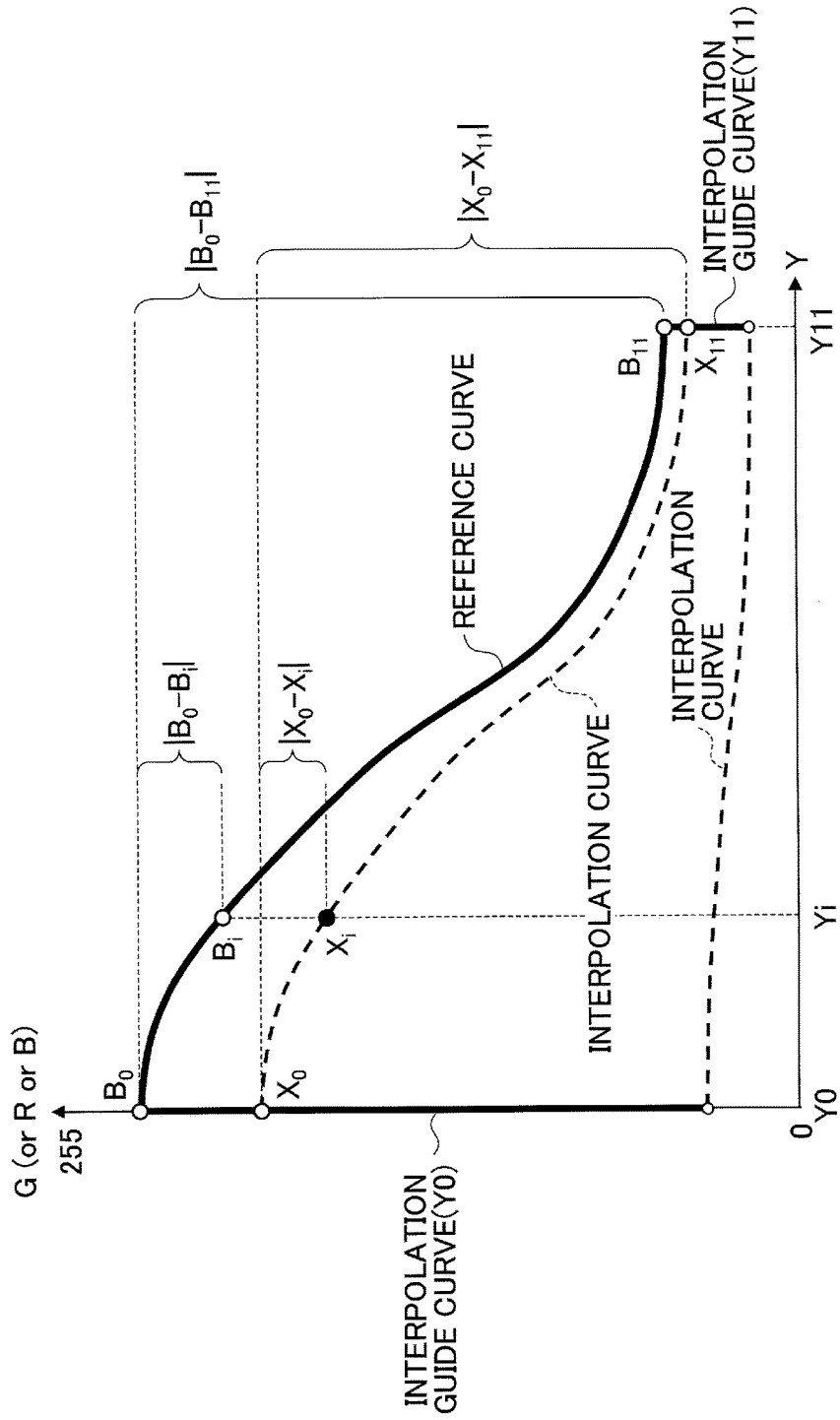
FIG. 15 is a diagram for illustrating an example of interpolation calculation.

As illustrated in FIG. 15, based on a ratio between $(B_0-B_{11})$ and $(B_0-B_i)$ and a ratio between $(X_0-X_{11})$ and $(X_0-X_i)$, the above Expression 1 calculates a reduction factor of the interpolated curve constituted with interpolated values with respect to the reference curve, to calculate $(X_0-X_i)$. This calculation is executed for each of color components R, G and B in the RGB color space, and for every Cn and Km. This enables to obtain the interpolated values for the color component values to be interpolated in the color space as the conversion source.

Next, the color conversion data generator 507 uses the colorimetric values obtained by the colorimetry executed by the RIP image colorimeter 506, the colorimetric values obtained by the colorimetry executed by the read image colorimeter 503, and the interpolated values interpolated by the interpolating calculator 504, to generate color conversion data (Step S407).

In other words, the color conversion data generator 507 associates a colorimetric value obtained by the colorimetry executed by the RIP image colorimeter 506 with a colorimetric value obtained by the colorimetry executed by the read image colorimeter 503 for the color patches corresponding to each other, to generate the color conversion data. The color conversion data generator 507 also associates an interpolated value interpolated by the interpolation calculator 504 with a color component value corresponding to the interpolated value among the color component values of the conversion source, to generate the color conversion data.

Finally, the color conversion data generator 507 generates a color conversion table in which the color conversion data generated at the above Step S407 is stored, to store the table in the storage 406 (Step S408).

As above, the inspection device 40 according to the embodiment can generate a color conversion table by using a color chart in which color patches whose interpolated values are to be calculated by the interpolation are reduced. Thus, according to the inspection device 40 according to the embodiment, it is possible to reduce the number of colors of color patches for generating a color conversion table (i.e., to reduce the number of sheets of a color chart).

More specifically, for magenta and yellow, a color conversion table can be generated with 12×3−2=34 gradations of a reference curve and interpolation guide curves. Therefore, the number of colors of color patches necessary to generate the color conversion table is the number of combinations of 12 gradations of cyan, 12 gradations of key plate, 34 gradations of magenta and yellow, which turns out to be 12×12×36=4,896 colors. Therefore, for example, compared to the case where 12 gradations are required for each color of CMYK (20,736 colors), it is possible to reduce the required number of sheets of the color chart to 4,896/1, 728≈2.8, namely, 3 pages or a quarter.

Second Embodiment

Next, a second embodiment will be described. In the first embodiment, a case has been described in which interpolation curves constituted with interpolated values have a similarity relationship with a reference curve. However, for example, depending on the printing process and the characteristics of the reader device, the similarity relationship between the interpolation curves and the reference curve cannot be maintained and an actual interpolation curve (not a curve obtained by the interpolation calculation but a curve obtained with actual colorimetry) may be distorted. In such a case, since the reference curve does not have a similarity relationship with the actual interpolation curve, an error may be generated between an interpolated value obtained by the interpolation calculation and an actual value (a colorimetric value obtained by actual colorimetry).

Figure 16:
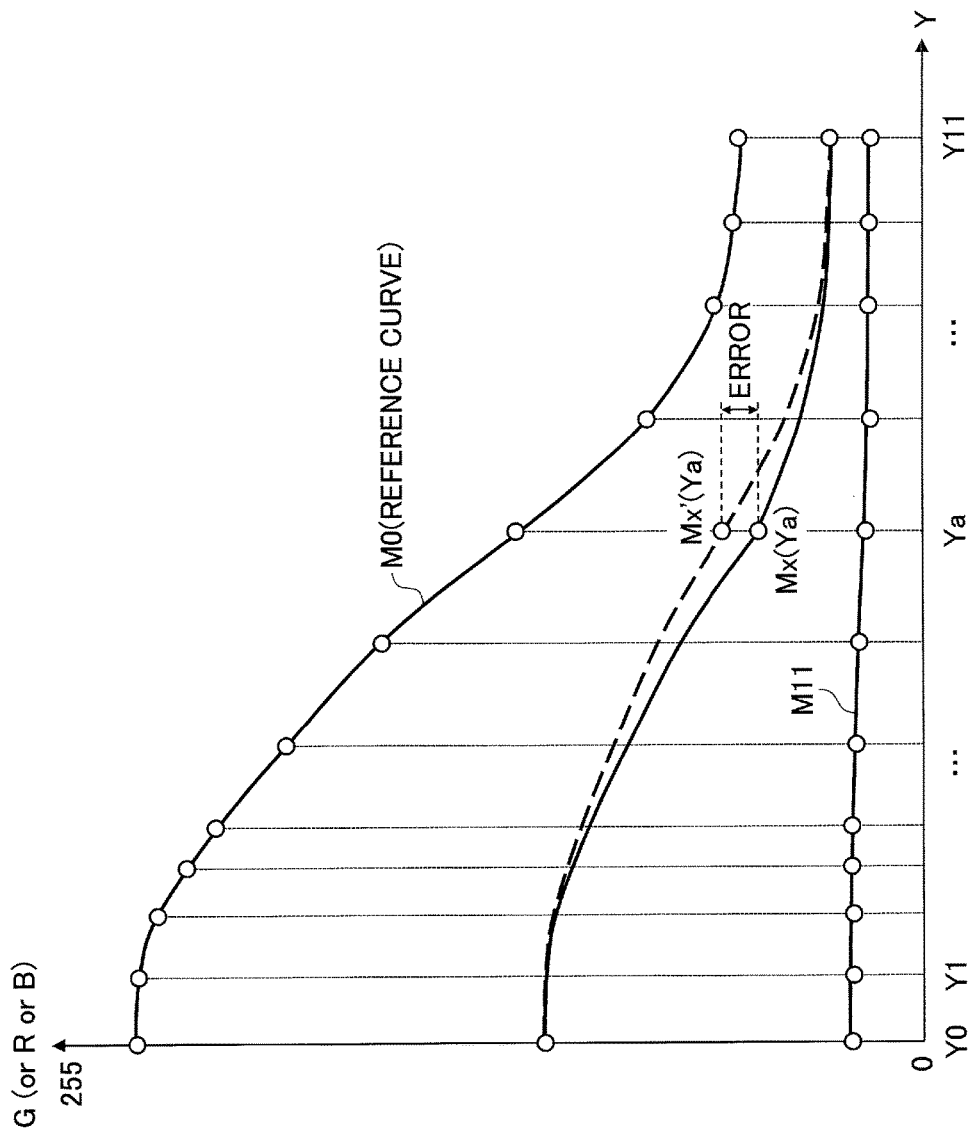
FIG. 16 is a diagram for illustrating an error between an actual colorimetric value and an interpolated value.

For example, denoting an interpolation curve by Mx and an actual interpolation curve by Mx', consider an intermediate gradation Ya. At this time, as illustrated in FIG. 16, an error may be generated between a value Mx(Ya) of Ya on the interpolation curve Mx (an interpolated value) and a value Mx' (Ya) of Ya on the actual interpolation curve Mx' (an actual colorimetric value) in Mx'.

Figure 17:
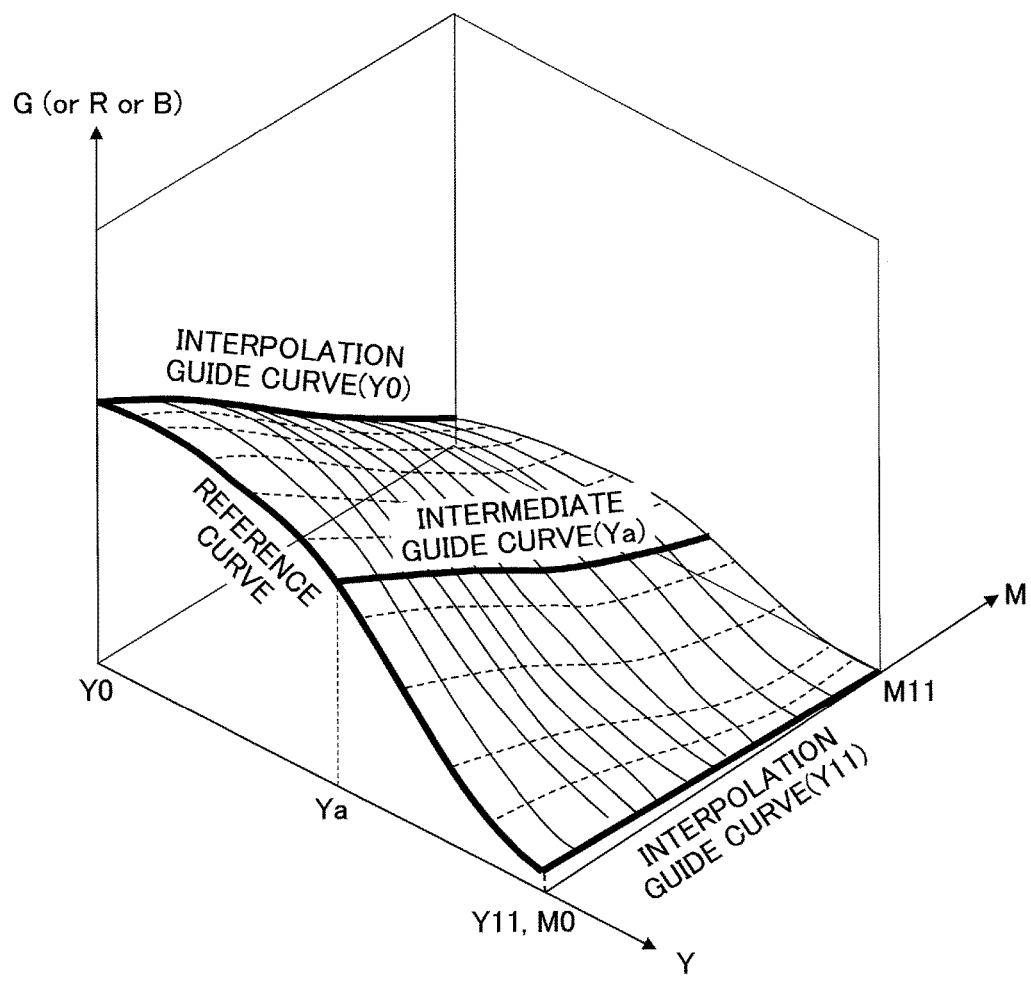
FIG. 17 is a diagram for illustrating an example of an intermediate guide curve.

Thereupon, in the second embodiment, an interpolation guide curve is added not only to the minimum gradation (e.g., Y0) and the maximum gradation (e.g., Y11) but also to an intermediate gradation. More specifically, for example, as illustrated in FIG. 17, an interpolation guide curve representing an intermediate gradation Ya (this is also referred to as an "intermediate guide curve") is added, and colorimetry is actually executed for the color component values on the intermediate guide curve. On the other hand, color component values between the minimum gradation and the intermediate gradation (Y1 to Y(a−1)) and between the intermediate gradation and the maximum gradation (Y(a+1) to Y10) are interpolated by the interpolation calculation. This enables to prevent generation of errors and to perform interpolation with high accuracy.

Note that in the second embodiment, different points from the first embodiment will be mainly described, and for substantially the same elements as those in the first embodiment, the same reference codes are assigned as in the first embodiment, and the description is omitted or simplified appropriately.

<Process of Determining Intermediate Guide Curve>

Figure 18:
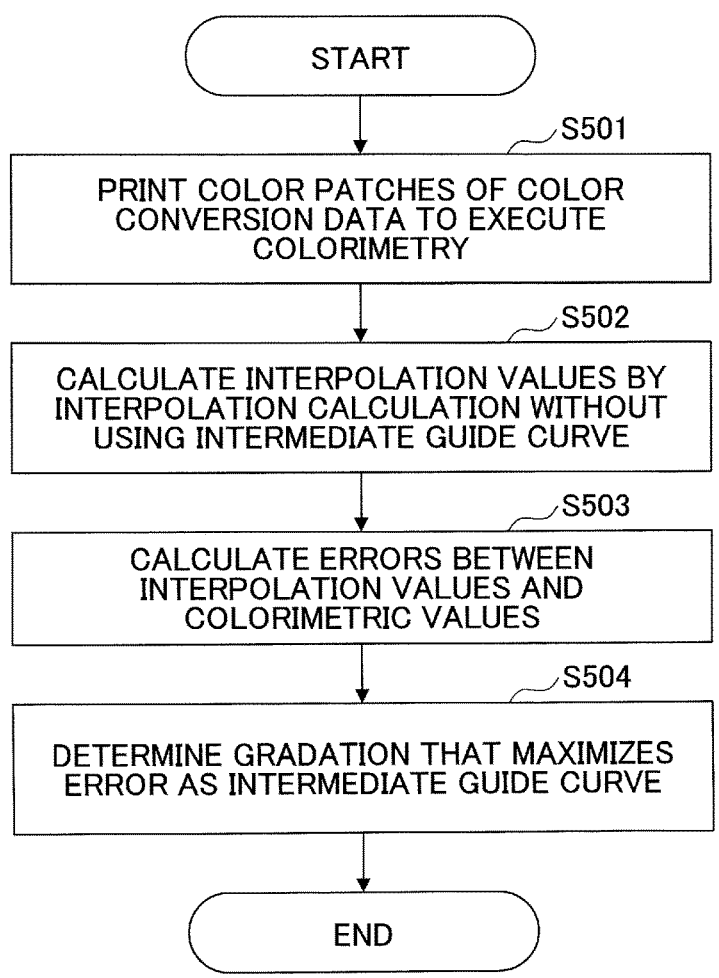
FIG. 18 is a flowchart illustrating an example of a process of determining an intermediate guide curve according to a second embodiment.

In the following, a process of determining a reference guide curve will be described with reference to FIG. 18. FIG. 18 is a flowchart illustrating an example of a process of determining an intermediate guide curve according to the second embodiment. The process of determining an intermediate guide curve illustrated in FIG. 18 is executed, for example, after the reference curve and interpolation guide curves are determined, and before the color chart is generated. Note that in the following, similarly to the above, assume that each color component of the CMYK color space as the conversion source is divided into 12 gradations and the conversion destination is the RGB color space.

First, the color conversion table generator 405 prints a color chart on which color patches for generating all color conversion data are arranged, to execute colorimetry on the color chart (Step S501). The color chart on which color patches for generating all color conversion data are arranged is, for example, a color chart in which color patches constituted with colors (20,736 colors) corresponding to combinations of CMYK colors each of which has 12 gradations. The printing and colorimetry of this color chart are carried out by executing Steps S401 to S405 in FIG. 14 for each color chart image.

Next, the interpolation calculator 504 obtains interpolated values (Step S502) as at Step 5406 in FIG. 14. In other words, the interpolation calculator 504 obtains interpolated values in the case of not using an intermediate guide curve.

Next, the interpolation guide curve determiner 502 uses the colorimetric values obtained at the above Step S501 and the interpolated values obtained at the above Step S502 to calculate errors between the corresponding colorimetric values and interpolated values (Step S503).

Next, the interpolation guide curve determiner 502 determines a curve representing a gradation (a gradation in a color component to be interpolated) at which the error calculated at Step S503 becomes the maximum, as the intermediate guide curve (Step S504). For example, when the gradation at which the error becomes the maximum is Ya, the interpolation guide curve determiner 502 determines the curve representing Ya as the intermediate guide curve. In this way, the intermediate guide curve is determined.

Note that in the embodiment, although a case has been described in which one intermediate guide curve is determined, two or more intermediate guide curves may be determined. For example, if two intermediate guide curves are to be determined, a curve that represents a gradation with the maximum error and a curve that represents a gradation with the second maximum error may be determined as the intermediate guide curves.

<Process of Generating Color Conversion Table>

Figure 19:
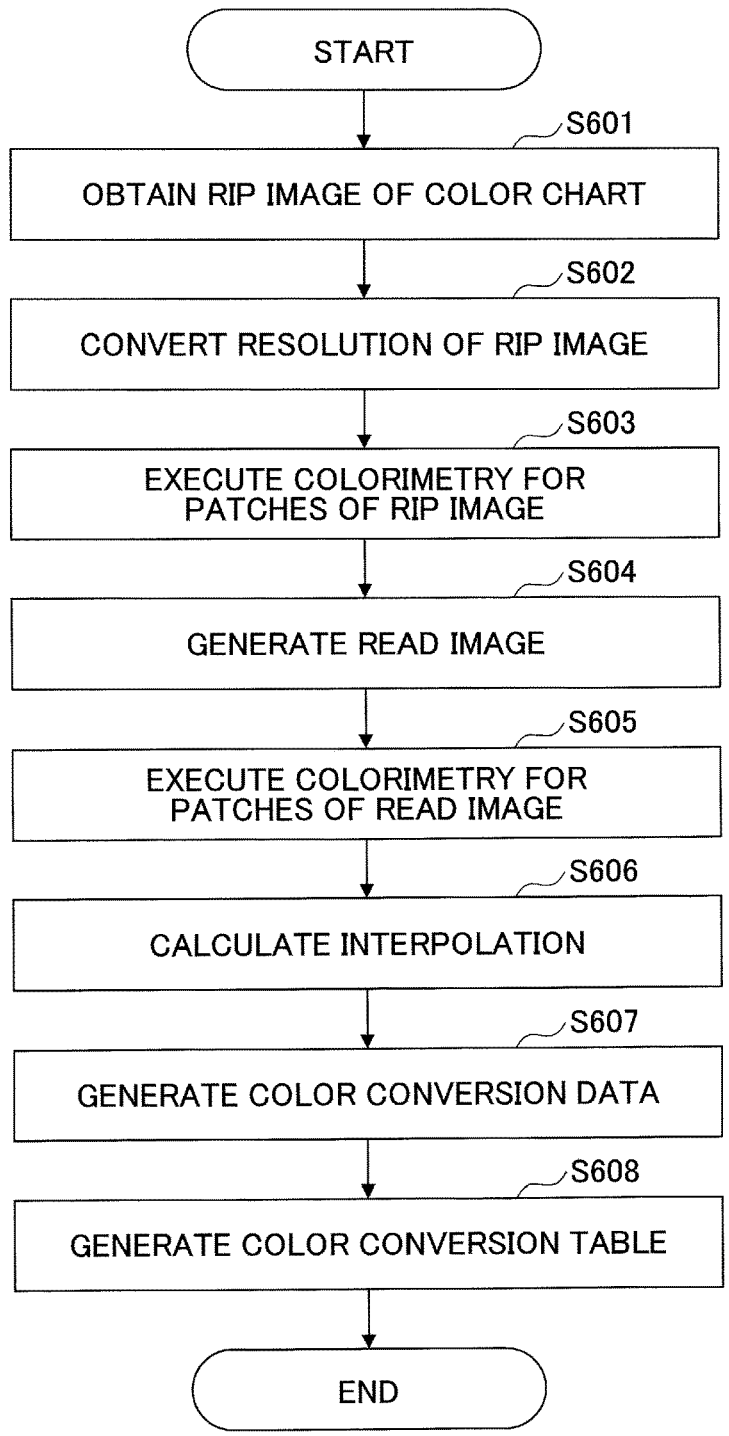
FIG. 19 is a flowchart illustrating an example of a process of generating a color conversion table according to the second embodiment.

In the following, a process of generating a color conversion table will be described with reference to FIG. 19. FIG. 19 is a flowchart illustrating an example of a process of generating a color conversion table according to the second embodiment. Note that in the following, similarly to the above, assume that each color component of the CMYK color space as the conversion source is divided into 12 gradations and the conversion destination is the RGB color space.

First, the RIP image obtainer 401 receives a RIP image from the engine controller 20 (Step S601). Note that at this time, the RIP image is an image obtained applying a RIP process to an original image of a color chart (a color chart image) on which only color patches for obtaining color component values (color component values in the conversion destination color space) on the reference curve, the interpolation guide curves, and the intermediate guide curve are arranged.

Next, the RIP image resolution converter 505 converts the resolution of the RIP image obtained by the RIP image obtainer 401 into the same resolution as the read image (Step S602). Note that as described above, the resolution of the RIP image is not necessarily converted into the same resolution as that of the read image.

Next, the RIP image colorimeter 506 executes colorimetry on each color patch on the RIP image whose resolution has been converted by the RIP image resolution converter 505 (Step S603). As a result, color component values in the CMYK color space of each color patch are obtained. Note that these color component values are color component values on one of the curves among the reference curve, the interpolation guide curves, and the intermediate guide curve which correspond to the color component values in the RGB color space as the conversion destination.

Next, the reader 403 reads an image formed on the sheet surface of the printing sheet output by the print engine 30, to generate a read image (Step S604). Note that at this time, on the printing sheet, an image obtained by applying a RIP process to the color chart image is formed on the sheet surface.

Next, the read image colorimeter 503 executes colorimetry on each of the color patches on the read image obtained by reading the printing sheet (Step S605). As a result, the color component values in the RGB color space of each color patch are obtained. Note that these color component values are color component values on one of the curves among the reference curve, the interpolation guide curves, and the intermediate guide curve.

Next, the interpolation calculator 504 uses the colorimetric values obtained by the read image colorimeter 503, to interpolate colorimetric values of colors not on the reference curve, the interpolation guide curves, and the intermediate guide curve by the interpolation calculation so as to obtain the interpolated values (Step S606).

Here, for example, in the case where an arbitrary gradation Cn of cyan and an arbitrary gradation Km of the key plate are fixed, an interpolated value $X_i$ in a color patch of an arbitrary gradation CnMxYiKm (x≠0, i≠0, i≠a, i≠11) is obtained by the following Expression 2 or 3. Note that $X_i$ is a color component value of one of R, G, and B in the RGB color space. Also, a is a gradation representing the intermediate guide curve.

If i<a, $$X_i = X_0 - \frac{B_0 - B_i}{B_0 - B_a} \times (X_0 - X_a) \qquad \text{(Expression 2)}$$

However, in the case of $B_0=B_a$, the above Expression 2 is not used; instead, it is assumed that $X_i=X_a$ if (0+a)/2<i, or $X_i=X_0$ if (0+a)/2≥i.

On the other hand, if i>a, $$X_i = X_a - \frac{B_a - B_i}{B_a - B_{11}} \times (X_a - X_{11}) \qquad \text{(Expression 3)}$$

However, in the case of $B_0=B_{11}$, the above Expression 3 is not used; instead, it is assumed that $X_i=X_{11}$ if (0+a)/2<i, or $X_i=X_0$ if (0+a)/2≥i.

Here, $B_0$ is a colorimetric value of the color patch of a gradation CnM0Y0Km (a color component value of one of R, G, and B in the RGB color space). This $B_0$ is a color component value on the reference curve, which is obtained at the above Step S605.

Also, $B_a$ is a colorimetric value of the color patch of a gradation CnM0YaKm (a color component value of one of R, G, and B in the RGB color space). This $B_a$ is a color component value on the reference curve, which is obtained at the above Step S605.

Also, $B_{11}$ is a colorimetric value of the color patch of a gradation CnM0Y11Km (a color component value of one of R, G, and B in the RGB color space). This $B_{11}$ is a color component value on the reference curve, which is obtained at the above Step S605.

Also, $B_i$ is a colorimetric value of the color patch of a gradation CnM0YiKm (a color component value of one of R, G, and B in the RGB color space). This $B_i$ is a color component value on the reference curve, which is obtained at the above Step S605.

Also, $X_0$ is a colorimetric value of the color patch of a gradation CnMxY0Km (a color component value of one of R, G, and B in the RGB color space). This $X_0$ is the color component value on one of the interpolation guide curves, which is obtained at the above Step S605.

Also, $X_a$ is a colorimetric value of the color patch of a gradation CnMxYaKm (a color component value of one of R, G, and B in the RGB color space). This $X_a$ is a color component value on the intermediate guide curve, which is obtained at the above Step S605.

Further, $X_{11}$ is a colorimetric value (a color component value of one of R, G, and B in the RGB color space) of the color patch of a gradation CnMxY11Km. This $X_{11}$ is the color component value on one of the interpolation guide curves, which is obtained at the above Step S605.

Figure 20B:
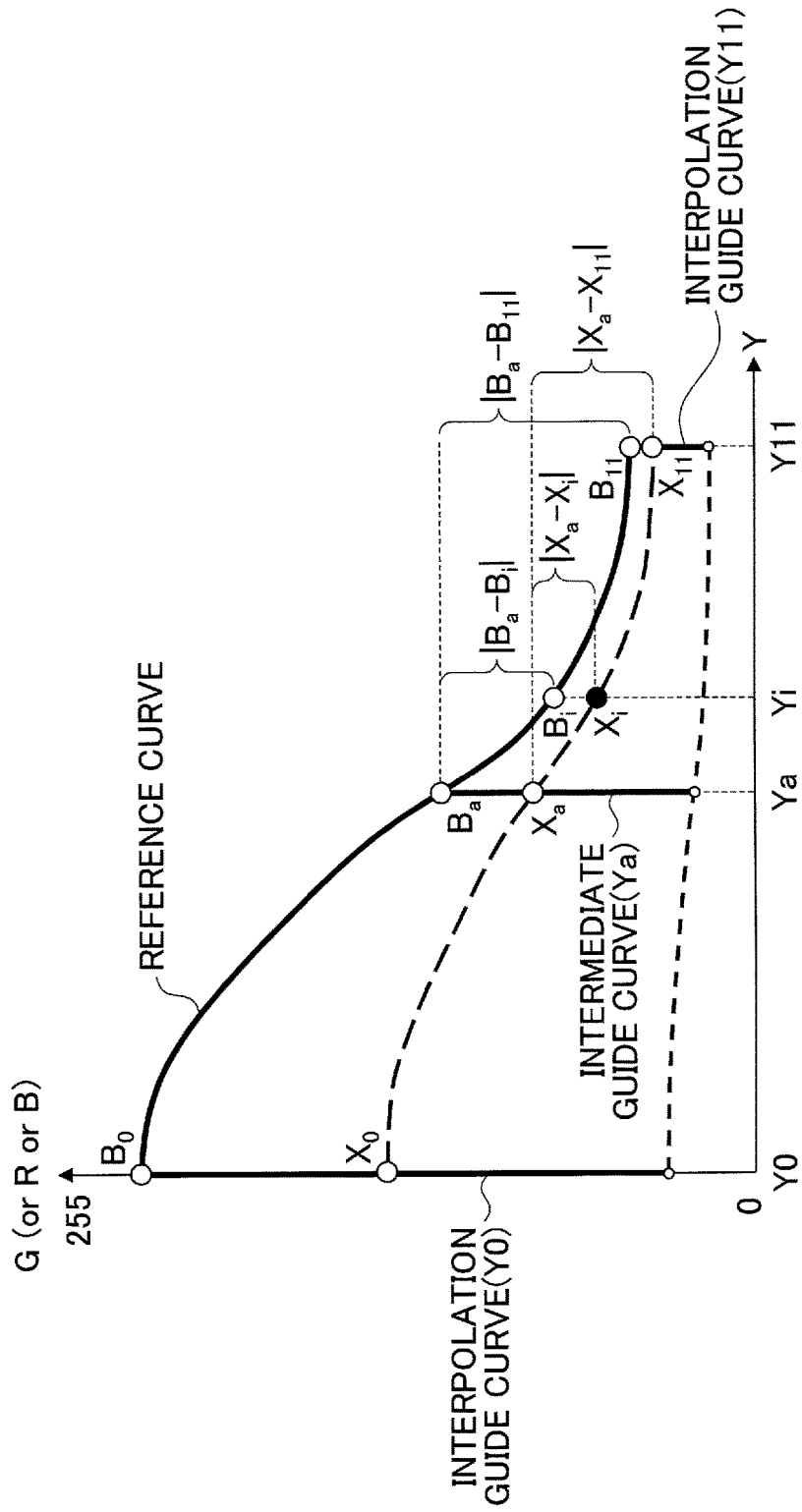

As illustrated in FIG. 20A, based on a ratio between $(B_0-B_i)$ and $(B_0-B_a)$ and a ratio between $(X_0-X_i)$ and $(X_0-X_a)$, the above Expression 2 calculates a reduction factor of the interpolated curve constituted with interpolated values with respect to the reference curve, to calculate $(X_0-X_i)$. Similarly, as illustrated in FIG. 20B, based on a ratio between $(B_a-B_i)$ to $(B_a-B_{11})$ and a ratio between $(X_a-X_i)$ and $(X_a-X_{11})$, the above Expression 3 calculates a reduction factor of the interpolated curve constituted with interpolated values with respect to the reference curve, to calculate $(X_a-X_i)$.

This calculation is executed for each of color components R, G and B in the RGB color space, and for every Cn and Km. This enables to obtain the interpolated values for the color component values to be interpolated in the color space as the conversion source.

Next, the color conversion data generator 507 uses the colorimetric values obtained by the colorimetry executed by the RIP image colorimeter 506, the colorimetric values obtained by the colorimetry executed by the read image colorimeter 503, and the interpolated values interpolated by the interpolating calculator 504, to generate color conversion data (Step S607).

In other words, the color conversion data generator 507 associates a colorimetric value obtained by the colorimetry executed by the RIP image colorimeter 506 with a colorimetric value obtained by the colorimetry executed by the read image colorimeter 503 for the color patches corresponding to each other, to generate the color conversion data. The color conversion data generator 507 also associates an interpolated value interpolated by the interpolation calculator 504 with a color component value corresponding to the interpolated value among the color component values of the conversion source, to generate the color conversion data.

Finally, the color conversion data generator 507 generates a color conversion table in which the color conversion data generated at the above Step S607 is stored, to store the table in the storage 406 (Step S608).

As above, the inspection device 40 according to the embodiment can generate a color conversion table by using a color chart in which color patches whose interpolated values are to be calculated by the interpolation are reduced. Thus, according to the inspection device 40 according to the embodiment, it is possible to reduce the number of colors of color patches for generating a color conversion table (i.e., to reduce the number of sheets of a color chart). Moreover, in the inspection device 40 according to the embodiment using the intermediate guide curve enables to reduce the error generated by the interpolation calculation.

In the embodiment, since it is necessary to execute colorimetry on the color component values on the intermediate guide curve, the number of colors of color patches is increased as compared with the first embodiment. More specifically, magenta and yellow need 12×4−3=45 gradations for the reference curve, the interpolation guide curves, and the intermediate guide curve. Therefore, the number of colors of the color patches necessary to generate the color conversion table is the number of combinations of 12 gradations of cyan, 12 gradations of key plate, 45 gradations of magenta and yellow, which turns out to be 12×12×÷=6,480 colors. Therefore, in the embodiment, the required number of sheets of a color chart is 6,480/1,728≈3.75, or 4 pages. In the embodiment, although the required number of sheets of a color chart increases as compared with the first embodiment, it is still possible to reduce the number of sheets of a color chart as compared with the conventional technology, while reducing the error generated by the interpolation calculation.

Third Embodiment

Next, a third embodiment will be described. As described in the first embodiment and the second embodiment, interpolating colorimetric values by the interpolation calculation enables to reduce the number of colors of color patches necessary to generate a color conversion table.

Thereupon, by making use of the reduction, it is possible to construct a color chart with which colorimetry can be executed with a higher accuracy. For example, as illustrated in FIG. 21, a color patch 3101 and a color patch 3201 of the same color are arranged on a color chart 3100 on a first page and a color chart 3200 on a second page, respectively. Also, at this time, for example, the position in the main scanning direction of the color patch 3101 in the color chart 3100 on the first page is located to be different from the position in the main scanning direction of the color patch 3201 in the color chart 3200 on the second page. Then, an average value is calculated between the colorimetric value of the color patch 3101 and the calorimetric value of the color patch 3201, so as to set this average value as the colorimetric value of the color of these color patches 3101 and 3201.

This enables, for example, to reduce the influence of color deviation generated by unevenness of the printer and/or the reader device, and/or color fluctuation among pages. Note that although the number of sheets of a color chart necessary to generate a color conversion table is doubled by such a construction of the color chart, the require number of sheets turns out to be 3×2=6 pages by using the first embodiment, and the number of sheets of the color chart is still reduced as compared with the conventional case.

Note that in the third embodiment, different points from the first embodiment will be mainly described, and for substantially the same elements as those in the first embodiment, the same reference codes are assigned as in the first embodiment, and the description is omitted or simplified appropriately.

<Functional Configuration>

Figure 22:
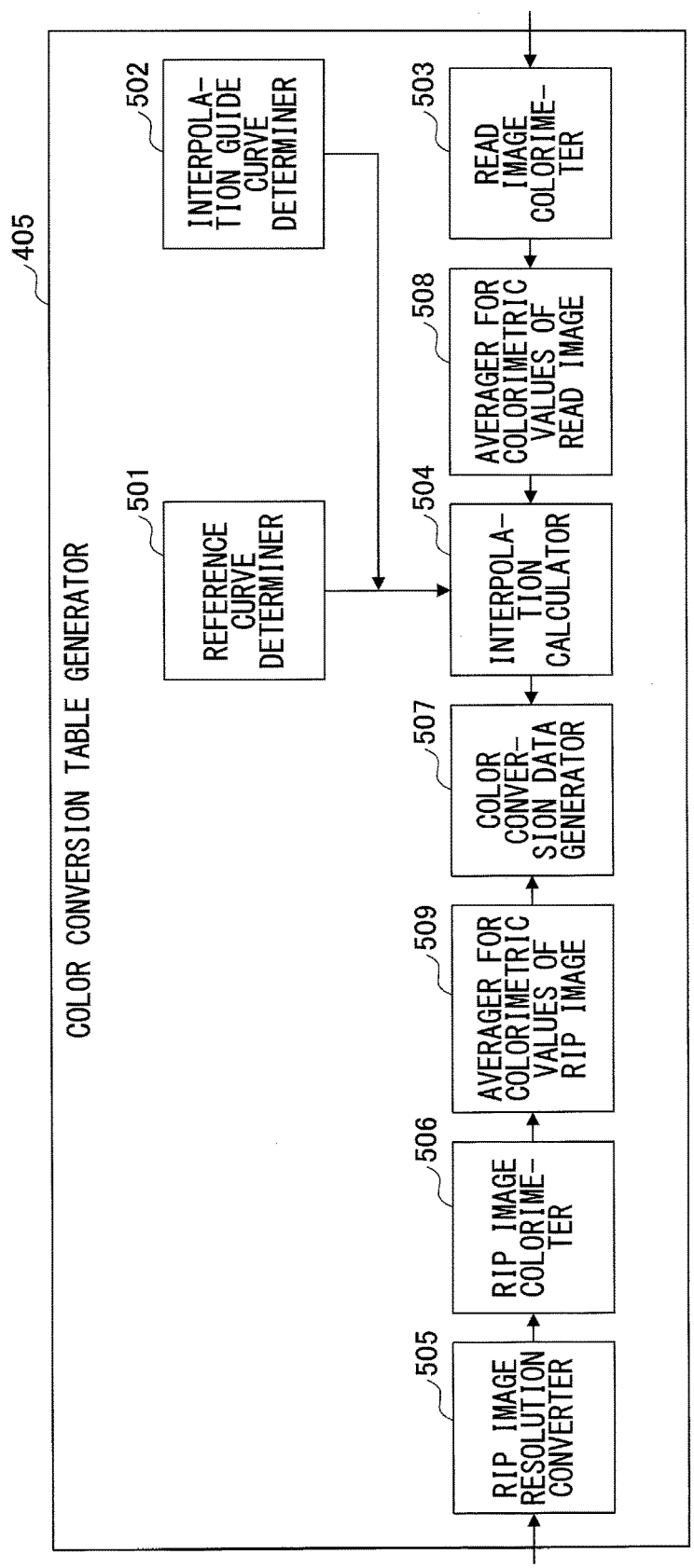
FIG. 22 is a diagram illustrating an example of a detailed functional configuration of a color conversion table generator according to a third embodiment.

First, a detailed functional configuration of a color conversion table generator 405 according to the embodiment will be described with reference to FIG. 22. FIG. 22 is a diagram illustrating an example of a detailed functional configuration of the color conversion table generator 405 according to the third embodiment.

As illustrated in FIG. 22, the color conversion table generator 405 according to the embodiment further includes an averager for colorimetric values of a read image 508 and an averager for colorimetric values of a RIP image 509.

The averager for colorimetric values of a read image 508 calculates an average value of colorimetric values of color patches corresponding to each other (color patches of the same color) among the color patches on which colorimetry has been executed by the read image colorimeter 503.

The averager for colorimetric values of a RIP image 509 calculates an average value of colorimetric values of color patches corresponding to each other (color patches of the same color) among the color patches on which colorimetry has been executed by the RIP image colorimeter 506.

<Process of Generating Color Conversion Table>

In the following, a process of generating a color conversion table will be described with reference to FIG. 23. FIG. 23 is a flowchart illustrating an example of a process of generating a color conversion table according to the third embodiment. Note that in the following, assume that each color component of the CMYK color space as the conversion source is divided into 12 gradations and the conversion destination is the RGB color space.

First, the RIP image obtainer 401 receives a RIP image from the engine controller 20 (Step S701). Note at this time, as described with reference to FIG. 21, for example, the RIP image is an image obtained applying a RIP process to a color chart image on which color patches for obtaining color component values of a reference curve and interpolation guide curves (color component values in the conversion destination color space) are arranged on multiple pages such that the positions are set to make the scanning directions different.

Next, the RIP image resolution converter 505 converts the resolution of the RIP image obtained by the RIP image obtainer 401 into the same resolution as that of the read image (Step S702). As described above, the resolution of the RIP image is not necessarily converted to be the same as the resolution of the read image.

Next, the RIP image colorimeter 506 executes colorimetry on each of the color patches on the RIP image whose resolution has been converted by the RIP image resolution converter 505 (Step S703).

Next, the averager for colorimetric values of a RIP image 509 calculates an average value of the colorimetric values of color patches corresponding to each other (color patches of the same color) among the color patches on which colorimetry has been executed by the RIP image colorimeter 506 (Step S704).

Next, the reader 403 reads an image formed on the sheet surface of the printing sheet output by the print engine 30, to generate a read image (Step S705). Note that at this time, on the printing sheet, the RIP image received at Step S701 is formed on the sheet surface.

Next, the read image colorimeter 503 executes colorimetry on each of the color patches on the read image obtained by reading the printing sheet (Step S706).

Next, the averager for colorimetric values of a read image 508 calculates an average value of the colorimetric values of the color patches corresponding to each other (color patches of the same color) among the color patches on which colorimetry has been executed by the read image colorimeter 503 (Step S707).

Next, the interpolation calculator 504 uses the average value calculated by the averager for colorimetric values of a read image 508, to interpolate the colorimetric values of colors not on the reference curve and the interpolation guide curves by the interpolation calculation, so as to obtain interpolated values (Step S706).

Here, for example, in the case where an arbitrary gradation Cn of cyan and an arbitrary gradation Km of the key plate are fixed, an interpolated value Xi in a color patch of an arbitrary gradation CnMxYiKm ($x \neq 0$, $i \neq 0$, $i \neq 11$) is obtained by the following Expression 1 as in the first embodiment. However, if $B_0 = B_{11}$, the above Expression 1 is not used; instead, it is assumed that $X_i = X_{11}$ if $(0+11)/2 < i$, or $X_i = X_0$ if $(0+11)/2 \geq i$.

In the third embodiment, $B_0$ is an average value of colorimetric values of the color patch of a gradation CnM0Y0Km (a color component value of one of R, G, and B in the RGB color space). This $B_0$ is the average value of the color component values in the same gradation on the reference curve, which is obtained at the above Step S707. Similarly, $B_{11}$, $B_i$, $X_0$, and $X_{11}$ are also the averages in the same gradation, which are obtained at the above Step S707.

Next, the color conversion data generator 507 uses the average values calculated by the averager for colorimetric values of a read image 508, the average values calculated by the averager for colorimetric values of a RIP image 509, and the interpolated values by the interpolation calculator 504, to generate color conversion data (Step S709).

In other words, the color conversion data generator 507 associates an average value calculated by the averager for colorimetric values of a read image 508 and an average value calculated by the averager for colorimetric values of a RIP image 509 for the color patches corresponding to each other, to generate the color conversion data. The color conversion data generator 507 also associates an interpolated value interpolated by the interpolation calculator 504 with a color component value corresponding to the interpolated value among the color component values of the conversion source, to generate the color conversion data.

Finally, the color conversion data generator 507 generates a color conversion table in which the color conversion data generated at the above Step S709 is stored, to store the table in the storage 406 (Step S710).

As above, the inspection device 40 according to the embodiment can generate a color conversion table by using a color chart in which color patches whose interpolated values are to be calculated by the interpolation are reduced. Thus, according to the inspection device 40 according to the embodiment, it is possible to reduce the number of colors of color patches for generating a color conversion table (i.e., to reduce the number of sheets of a color chart). In addition, in the embodiment, using the average values of the colorimetric values of the color patches of the same color enables to execute colorimetry with high accuracy in which the influence of color deviation and/or color fluctuation is reduced.

Note that in the embodiment, the average value is calculated for the colorimetric values of two color patches corresponding to each other, but it is not limited as such. For example, the average values may be calculated for the colorimetric values of three or more color patches corresponding to each other.

Note that in the first to third embodiments, as an example, the color space as the conversion source is the CYMK color space and the color space as the conversion destination is the RGB color space, but these are not limited as such; the source color space and the destination color space may be any color space, for example, the Lab color space or the like. Also, in the first to third embodiments, as an example, although each color component in the CYMK color space is divided into 12 gradations, it is not limited as such; each color component may be divided into any number of gradations.

Furthermore, in the first to third embodiments, as an example, yellow (Y) among the color components in the CYMK color space is set as the color component to be interpolated for the intermediate gradations, but it is limited as such. Any color component other than yellow (Y) may be used as the color component to be interpolated for the intermediate gradations. Two or more color components may be used as the color components to be interpolated for the intermediate gradations.

The present inventive concept is not limited to the specific embodiments disclosed above, and various modifications and changes can be made without departing from the scope of the claims.

The present application claims priority under 35 U.S.C. § 119 of Japanese Patent Application No. 2018-015939 filed on Jan. 31, 2018, the entire contents of which are hereby incorporated by reference.

What is claimed is:

1. An image processing apparatus that generates color conversion data in which first color component values in a first color space are associated with second color component values in a second color space, the image processing apparatus comprising:
    a memory; and
    at least one processor configured to execute:
    determining, as a reference curve, a curve taking a maximum value in the second color space among curves representing gradations of color components in the first color space;
    determining, as interpolation guide curves, curves representing a maximum gradation and a minimum gradation, respectively, of a color component to be interpolated among the color components in the first color space;
    executing colorimetry on color patches corresponding to second color component values included in the reference curve and on color patches corresponding to second color component values included in the interpolation guide curves;
    interpolating second color component values not included in the reference curve and the interpolation guide curves, based on the second color component values obtained by the colorimetry; and
    generating the color conversion data by using the second color component values obtained by the colorimetry and the second color component values interpolated by the interpolating.

2. The image processing apparatus as claimed in claim 1, wherein the interpolating interpolates the second color component values not included in the reference curve and the interpolation guide curves, based on a proportional relationship between the second color component values included in the reference curve and the second color component values not included in the reference curve and the interpolation guide curves.

3. The image processing apparatus as claimed in claim 1, wherein in addition to determining the interpolation guide curves, the determining further determines, as an intermediate guide curve, a curve representing an intermediate gradation among the gradations of the color component to be interpolated, the intermediate gradation being less than the maximum gradation and greater than the minimum gradation, and wherein the executing further executes the colorimetry on color patches corresponding to second color component values included in the intermediate guide curve.

4. The image processing apparatus as claimed in claim 1, wherein the first color space is a CMYK color space, and wherein when the determining determines, as the reference curve, a curve of a color component other than yellow among the curves having the maximum value in the second color space.

5. An image processing method executed by a computer that generates color conversion data in which first color component values in a first color space are associated with second color component values in a second color space, the method comprising:

determining, as a reference curve, a curve taking a maximum value in the second color space among curves representing gradations of color components in the first color space;

determining, as interpolation guide curves, curves representing a maximum gradation and a minimum gradation, respectively, of a color component to be interpolated among the color components in the first color space;

executing colorimetry on color patches corresponding to second color component values included in the reference curve and on color patches corresponding to second color component values included in the interpolation guide curves;

interpolating second color component values not included in the reference curve and the interpolation guide curves, based on the second color component values obtained by the colorimetry; and generating the color conversion data by using the second color component values obtained by the colorimetry and the second color component values interpolated by the interpolating.

6. A non-transitory computer-readable recording medium having computer readable instructions stored thereon, which when executed, cause a computer to execute a method of generating color conversion data in which first color component values in a first color space are associated with second color component values in a second color space, the method comprising:

determining, as a reference curve, a curve taking a maximum value in the second color space among curves representing gradations of color components in the first color space;

determining, as interpolation guide curves, curves representing a maximum gradation and a minimum gradation, respectively, of a color component to be interpolated among the color components in the first color space;

executing colorimetry on color patches corresponding to second color component values included in the reference curve and on color patches corresponding to second color component values included in the interpolation guide curves;

interpolating second color component values not included in the reference curve and the interpolation guide curves, based on the second color component values obtained by the colorimetry; and generating the color conversion data by using the second color component values obtained by the colorimetry and the second color component values interpolated by the interpolating.

* * * * *